United States Patent
Arar et al.

(10) Patent No.: US 12,552,404 B2
(45) Date of Patent: Feb. 17, 2026

(54) DEEP-LEARNING BASED-ENVIRONMENTAL MODELING FOR VEHICLE ENVIRONMENT VISUALIZATION

(71) Applicant: NVIDIA CORPORATION, Santa Clara, CA (US)

(72) Inventors: Nuri Murat Arar, Zurich (CH); Niranjan Avadhanam, Saratoga, CA (US); Abhishek Haridas Badki, Santa Clara, CA (US); Hang Su, Cambridge, MA (US); Jan Kautz, Lexington, MA (US); Orazio Gallo, Santa Cruz, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 18/680,174

(22) Filed: May 31, 2024

(65) Prior Publication Data

US 2025/0289455 A1    Sep. 18, 2025

Related U.S. Application Data

(60) Provisional application No. 63/566,129, filed on Mar. 15, 2024, provisional application No. 63/565,885, filed on Mar. 15, 2024.

(51) Int. Cl.
*B60Q 1/00* (2006.01)
*B60W 50/14* (2020.01)
(Continued)

(52) U.S. Cl.
CPC ............... *B60W 50/14* (2013.01); *G06T 7/50* (2017.01); *G06T 17/20* (2013.01); *G06V 10/26* (2022.01);
(Continued)

(58) Field of Classification Search
CPC ........... B60W 50/14; B60W 2050/146; B60W 2420/403; B60W 2520/10;
(Continued)

(56) References Cited

U.S. PATENT DOCUMENTS 10,885,698 B2   1/2021   Muthler et al.
11,379,950 B1   7/2022   Hamilton et al.
(Continued)

OTHER PUBLICATIONS

IEC 61508, "Functional Safety of Electrical/Electronic/Programmable Electronic Safety-related Systems," Retrieved from Internet URL: https://en.wikipedia.org/wiki/IEC_61508, accessed on Apr. 1, 2022, 7 pages.
(Continued)

*Primary Examiner* — Toan N Pham
(74) *Attorney, Agent, or Firm* — Freestone Intellectual Property Law PLLC; Wesley A. Horner

(57) ABSTRACT

In various examples, an environment visualization pipeline may determine whether to generate or otherwise enable a visualization using an environmental modeling pipeline that models an environment as a 3D bowl or using an environmental modeling pipeline that models the environment using some other 3D representation, such as a detected 3D surface topology. The determination may made based on various factors, such as ego-machine state, (e.g., one or more detected features indicative of a designated operational scenario, proximity to a detected object, speed of ego-machine, etc.), estimated image quality of a corresponding environment visualization, and/or other factors. Accordingly, an environment around an ego-machine, such as a vehicle, robot, and/or other type of object, may be visualized in systems such as parking visualization systems, Surround View Systems, and/or others.

20 Claims, 15 Drawing Sheets

(51) Int. Cl.
    *G06T 7/50*     (2017.01)
    *G06T 17/20*     (2006.01)
    *G06V 10/26*     (2022.01)
    *G06V 10/98*     (2022.01)
    *G06V 20/56*     (2022.01)

(52) U.S. Cl.
    CPC ............ *G06V 10/993* (2022.01); *G06V 20/56* (2022.01); *B60W 2050/146* (2013.01); *B60W 2420/403* (2013.01); *B60W 2520/10* (2013.01); *B60W 2554/80* (2020.02); *G06T 2207/10028* (2013.01); *G06T 2207/30168* (2013.01); *G06T 2207/30252* (2013.01)

(58) Field of Classification Search
    CPC ...... B60W 2554/80; G06T 7/50; G06T 17/20; G06T 2207/10028; G06T 2207/30168; G06T 2207/30252; G06V 10/26; G06V 10/993; G06V 20/56
    See application file for complete search history.

(56) References Cited

U.S. PATENT DOCUMENTS

| | | | |
|---|---|---|---|
| 2016/0093101 A1 | 3/2016 | Benedek et al. | |
| 2016/0360104 A1* | 12/2016 | Zhang | H04N 23/698 |
| 2021/0158493 A1* | 5/2021 | Slutsky | G06T 3/4038 |
| 2022/0122326 A1 | 4/2022 | Reitmayr et al. | |
| 2022/0165031 A1 | 5/2022 | Lin | |
| 2022/0292699 A1 | 9/2022 | Zhu et al. | |
| 2023/0316458 A1 | 10/2023 | Ren et al. | |
| 2023/0316635 A1 | 10/2023 | Jiang et al. | |
| 2023/0316772 A1 | 10/2023 | Hu et al. | |
| 2023/0316773 A1 | 10/2023 | Avadhanam et al. | |
| 2023/0319218 A1 | 10/2023 | Ren et al. | |
| 2024/0135487 A1* | 4/2024 | Kristensen | G06T 3/4038 |
| 2024/0249462 A1 | 7/2024 | Chupeau et al. | |
| 2025/0071255 A1 | 2/2025 | Wilson et al. | |

OTHER PUBLICATIONS

ISO 26262, "Road vehicle—Functional safety," International standard for functional safety of electronic system, Retrieved from Internet URL: https://en.wikipedia.org/wiki/ISO_26262, accessed on Sep. 13, 2021, 8 pages.

Taxonomy and Definitions for Terms Related to Driving Automation Systems for On-Road Motor Vehicles, National Highway Traffic Safety Administration (NHTSA), A Division of the US Department of Transportation, and the Society of Automotive Engineers (SAE), Standard No. J3016-201609, pp. 1-30 (Sep. 30, 2016).

Taxonomy and Definitions for Terms Related to Driving Automation Systems for On-Road Motor Vehicles, National Highway Traffic Safety Administration (NHTSA), A Division of the US Department of Transportation, and the Society of Automotive Engineers (SAE), Standard No. J3016-201806, pp. 1-35 (Jun. 15, 2018).

Non-Final Office Action, U.S. Appl. No. 18/670,373, Notification Date: May 29, 2025, 11 pages.

Final Office Action, U.S. Appl. No. 18/670,373, Notification Date: Dec. 29, 2025, 14 pages.

Non-Final Office Action, U.S. Appl. No. 18/670,416 Notification Date: Jan. 14, 2026, 23 pages.

\* cited by examiner

BAY VIEW IN PARKING SPOT – SURFACE TOPOLOGY VISUALIZATION 300L

BAY VIEW IN PARKING SPOT – BOWL VISUALIZATION 300K

DEEP-LEARNING BASED-ENVIRONMENTAL MODELING FOR VEHICLE ENVIRONMENT VISUALIZATION

CROSS-REFERENCE TO RELATED APPLICATIONS

This application claims the benefit of U.S. Provisional Application No. 63/566,129 filed on Mar. 15, 2024, and U.S. Provisional Application No. 63/565,885 which was filed on Mar. 15, 2024. The contents of each of the foregoing applications are incorporated by reference in their entirety.

BACKGROUND

Vehicle Surround View Systems provide occupants of a vehicle with a visualization of the area surrounding the vehicle. For drivers, Surround View Systems provide the driver with the ability to see the vicinity of the environment, including blind spots where the driver's line of sight is occluded by parts of the driver's vehicle or other objects in the environment, without the need to reposition (e.g., turn their head, get off the driver's seat, lean a certain direction, etc.). This visualization may assist and facilitate a variety of driving maneuvers, such as smoothly entering or exiting a parking spot without colliding with vulnerable road users—like pedestrians—or objects—such as a road curb or other vehicles. More and more vehicles, especially those of luxury brands or newer models, are being produced with Surround View Systems equipped. The Surround View Systems of existing vehicles usually utilize fisheye cameras-typically mounted at the front, left, rear and right sides of the vehicle body—to perceive the surrounding area from multiple directions. In some techniques, frames from the individual cameras are stitched together using camera parameters to align frames and blending techniques to combine overlapping regions to provide a top-down 360° surround view visualization.

There are a variety of techniques to generate visualizations of a surrounding environment, some of which rely on different assumptions about the geometry of the surrounding environment. As a practical matter, no model is perfect, so selection of a particular technique to generate a surround view visualization may be seen as a design choice with various benefits and drawbacks. For example, in some existing Surround View Systems, two-dimensional (2D) images are used to approximate a three-dimensional (3D) visual representation of the environment surrounding the vehicle by modeling the geometry of the environment surrounding the vehicle as a virtual 3D bowl shape. The 3D bowl shape typically comprises a flat, circular ground plane for the inner portion of the bowl connected to an outer bowl represented as a curved surface rising from the ground plane to a height or with a slope that increases proportionally to the distance from the bowl center. As such, some conventional systems project (e.g., stitched) images onto this 3D bowl shape, render a view of the projected image data on the 3D bowl shape from the perspective of a virtual camera, and present the rendered view on a monitor visible to occupants or an operator (e.g., driver) of the vehicle. However, the projection and/or stitching processes can introduce a variety of artifacts, including geometric distortions (e.g., size or shape misalignments), texture distortions (e.g., blur, ghosting, object disappearance, object distortions), and color distortions. Since these artifacts may obscure or omit useful visual information and are often distracting to the driver, the artifacts can interfere with the safe operation of the vehicle in certain scenarios.

As a result, there is a need for improved visualization techniques that reduce visual artifacts, better represent useful visual information, and/or otherwise improve the visual quality of resulting images.

SUMMARY

Embodiments of the present disclosure relate to environmental modeling for vehicle environment visualization. Systems and methods are disclosed that determine whether to implement different environmental modeling pipelines to generate visualizations. In contrast to conventional systems, such as those described above, systems and methods are disclosed that determine whether to generate or otherwise enable a visualization using an environmental modeling pipeline that models the surrounding environment as a 3D bowl or using an environmental modeling pipeline that models the surrounding environment using some other 3D representation, such as a detected 3D surface topology. The determination may be made based on various factors, such as ego-machine state (e.g., one or more detected features indicative of a designated operational scenario (e.g., a parking scenario, off-road scenario, etc.) proximity to a detected object, speed of ego-machine, etc.), estimated or predicted image quality of a corresponding environment visualization, and/or other factors. The present techniques may be used to visualize an environment around an ego-machine, such as a vehicle, robot, and/or other type of object, in systems such as parking visualization systems, Surround View Systems, and/or others.

BRIEF DESCRIPTION OF THE DRAWINGS

The present systems and methods for environmental modeling for vehicle environment visualization are described in detail below with reference to the attached drawing figures, wherein.

DETAILED DESCRIPTION

Figure 1:
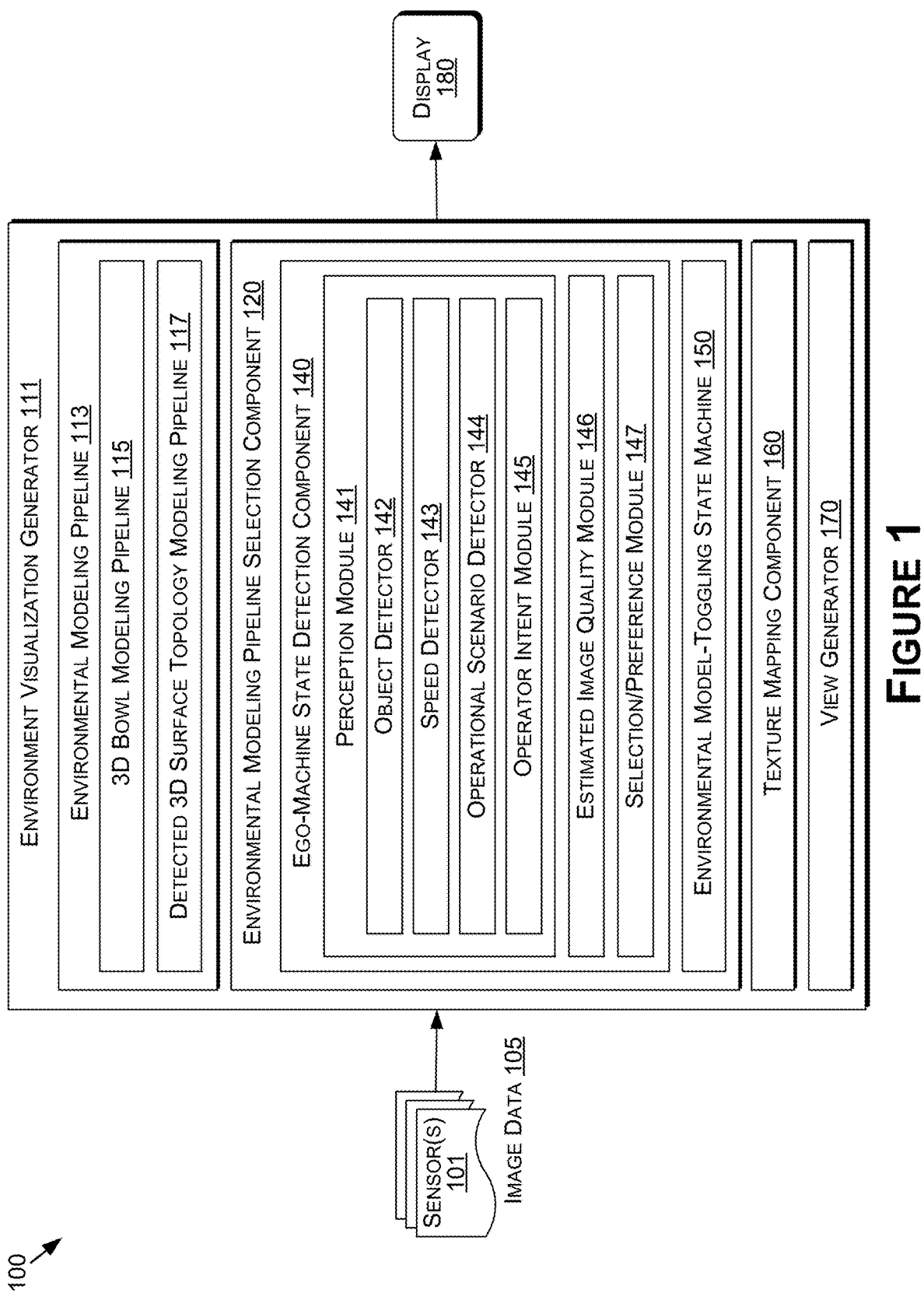
FIG. 1 is an example environment visualization pipeline, in accordance with some embodiments of the present disclosure.

Systems and methods are disclosed related to environmental modeling for vehicle environment visualization. Although the present disclosure may be described with respect to an example autonomous or semi-autonomous vehicle or machine 500 (alternatively referred to herein as "vehicle 500" or "ego-machine 500," an example of which is described with respect to FIGS. 5A-5D), this is not intended to be limiting. For example, the systems and methods described herein may be used by, without limitation, non-autonomous vehicles or machines, semi-autonomous vehicles or machines (e.g., in one or more advanced driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. In addition, although the present disclosure may be described with respect to surround view visualizations for vehicles, this is not intended to be limiting, and the systems and methods described herein may be used in augmented reality, virtual reality, mixed reality, robotics, security and surveillance, autonomous or semi-autonomous machine applications, and/or any other technology spaces where vehicle environment visualizations may be used.

Example systems and methods are disclosed that determine whether to generate a visualization using an environmental modeling pipeline that models the surrounding environment as a 3D bowl or using an environmental modeling pipeline that models the surrounding environment using some other 3D representation, such as a detected 3D surface topology or a 3D point cloud. The determination may made based on various factors, such as ego-machine state (e.g., proximity to a detected pedestrian, one or more detected features indicative of a designated operational scenario, such as a detected parking scenario in which the ego-machine is operating or predicted to begin operating), estimated image quality of one or more source images and/or a corresponding environment visualization, and/or other factors. The present techniques may be utilized to visualize an environment around an ego-machine, such as a vehicle, robot, and/or other type of object, in systems such as parking visualization systems, Surround View Systems, and/or others.

At a high level, an environment visualization pipeline (e.g., of an ego-machine) may support the use of a plurality of environmental modeling techniques to generate different types of visualizations of the surrounding environment in different scenarios, for example, based on the benefits of using each of the plurality of environmental modeling techniques in the different scenarios. For example, the environment visualization pipeline may support an environmental modeling pipeline that models the surrounding environment as a detected 3D surface topology when generating a visualization (e.g., in certain scenarios, such as lower speed of ego-motion, detected objects within a threshold distance, and/or others), and/or an environmental modeling pipeline that models the surrounding environment as a 3D bowl when generating a visualization (e.g., in other scenarios, such as higher speed of ego-motion, no detected objects within a threshold distance, and/or others).

Taking a 3D bowl model as an example, depending on the implementation and/or scenario, any known technique may be used to model the surrounding environment as a 3D bowl and/or generate a visualization of a 3D bowl that models the surrounding environment (e.g., a bowl visualization). Compared to environmental modeling techniques that model the surrounding environment in other ways such as a detected 3D surface topology, many implementations that generate a bowl visualization will have relatively lower processing demands, so a bowl visualization may be generated faster and with lower computational expenses than using other techniques. Further, by projecting or texturizing image data onto a 3D bowl model, the image data may effectively be stretched onto the bowl, reducing or eliminating gaps resulting from occlusions that other technique will often generate. While closing these gaps may be considered beneficial, the stretching effect may result in a scale magnification. In some cases, the benefit in avoiding gaps in the resulting visualization may be considered worth the cost of some visual artifacts. However, in certain implementations and/or scenarios (e.g., in some scenarios in which there are detected objects or obstacles such as vehicles or pedestrians within a threshold distance), it may be desirable to use a different visualization technique.

As such, in some implementations and/or scenarios, a visualization of an environment may be generated using a detected 3D surface topology to model the environment. For example, and as described in more detail in U.S. Provisional Application No. 63/565,885, the contents of which are incorporated by reference herein, the environment surrounding an ego-machine may be visualized by extracting one or more depth maps from sensor data (e.g., image data), converting the depth map(s) into a detected 3D surface topology of the surrounding environment, and/or texturizing the detected 3D surface topology with the sensor data. The detected 3D surface topology may model the geometry of the surrounding environment as a 3D surface using a (e.g., truncated) signed distance function (SDF) that encodes the distance of each voxel in a 3D grid to the detected 3D surface topology represented by the one or more depth maps. A 3D surface representation of the detected 3D surface (e.g., a 3D mesh) may be extracted from the detected 3D surface topology and may be smoothed using any known technique. As such, the sensor data (e.g., the image data) may be back-projected onto the 3D surface representing the detected 3D surface topology (e.g., 3D surface mesh) using corresponding depth values (e.g., represented by the unsmoothed 3D surface representation, rendered using unstructured lumigraph rendering, etc.) in each back-projection to generate a texturized 3D surface. As such, a surface topology visualization may be generated by rendering a view of the texturized 3D surface, or by generating a view (e.g., a 2D image with placeholder pixels) of the untexturized detected 3D surface topology, projecting depth values into the 2D view (e.g., generating a corresponding depth map), and texturizing the 2D view using corresponding (e.g., per-pixel) depth values.

In some implementations and/or scenarios, the detected 3D surface topology may be represented as a (e.g., featurized) point cloud and a visualization of an environment may be generated using a detected 3D surface topology to model the environment (e.g., a surface topology visualization). For example, sensor data (e.g., images from different cameras of the ego-machine) may be applied to one or more neural networks to extract corresponding depth map(s), and the depth map(s) may be featurized (e.g., by assigning each pixel in the depth map a color from a corresponding pixel of an input image). The featurized depth map(s) may be uplifted to generate and/or featurize a sparse point cloud representing the detected 3D surface topology of the surrounding environment (e.g., where each point of the featurized point cloud carries a color value from the corresponding pixel of image data). As such, a surface topology visualization may be generated by rendering a view of the featurized point cloud, and/or applying the resulting (e.g., sparse) image to a neural render to densify and generate a photo-realistic image.

Compared to environment visualization techniques that model the surrounding environment as a 3D bowl, modeling the surrounding environment as a detected 3D surface topology may provide a more realistic view of the surrounding environment in certain scenarios, and many of the possible visual artifacts in a bowl visualization (e.g., scale magnification, object disappearance, etc.) are unlikely to appear in a corresponding surface topology visualization. For example, nearby objects (e.g., mobile obstacles or a subclass thereof such as a vehicles, pedestrians, and/or others) are less likely to be distorted, obscured, or omitted from a surface topology visualization. However, in some scenarios, a surface topology visualization may be rendered from a view that includes regions of the environment that were not observed in the source sensor (e.g., image) data. As a result, rendering a surface topology visualization may result in artifacts, such as gaps (e.g., occlusions), in the surface topology visualization where there is no image data (e.g., or historical image data) representing a specific area. Further, in some implementations (e.g., that use a neural renderer), running a visualization pipeline that models the surrounding environment as a detected 3D surface topology may be more computationally expensive than an alternative supported approach (e.g. using a 3D bowl model), and visual artifacts may be introduced into the surface topology visualization in certain scenarios (e.g., when the image cannot be rendered quickly enough). In this regard, in some implementations and/or scenarios, it may be desirable to model the surrounding environment as a detected 3D surface topology when a detected measure of image quality (e.g., a measure of the number or size of occluded regions) of the surface topology visualization is above a designated threshold value.

Accordingly, to capture the benefits of certain environmental modeling techniques in certain scenarios, in some embodiments, a state machine may be used to select, enable, or switch between supported environmental modeling techniques, which may be based on any number of detectible factors, such as the state of the ego-machine (e.g., proximity to a detected pedestrian; proximity to detected objects; detected operational scenario such as a designated parking scenario or off-road scenario; speed of ego-motion; and/or others); estimated or predicted image quality of a corresponding visualization (e.g., which may be based on confidence of corresponding depth estimates used to generate the visualization); selections and/or preferences of an operator of the ego-machine; and/or others. Some implementations may provide different selectable visualization options supported by different environmental modeling techniques. Additionally or alternatively, some visualizations or selectable visualization options may be enabled or disabled based on the state of the ego-machine or estimated and/or a predicted image quality of a corresponding visualization.

Typically, visualizations generated by modeling the surrounding environment using a 3D bowl will be sharp and will not have holes, and in many implementations, will be computationally cheaper to run than other supported modeling techniques. As such, in some embodiments, one or more visualizations that rely on a 3D bowl model may be enabled (e.g., displayed or made available for selection) as a baseline or default. In an example implementation, one or more detectible features may be used to determine to disable one or more visualizations that rely on a 3D bowl model and/or enable one or more visualizations that rely on a different model of the surrounding environment such as a detected 3D surface topology and/or that rely on neural rendering. Example features that may be used to enable one or more visualizations that rely on a detected 3D surface topology and/or neural rendering include detected close objects of a designated class (e.g., vehicles) within a threshold proximity, detecting close objects of an unsupported class (e.g., trees or other objects that supported object detectors may not be designed to detect) within a threshold proximity, for example, by using detected depth estimation, detected ego-machine speeds below a threshold (e.g., representative of a parking scenario), detected operator intent (e.g., representative of a parking scenario), predicted confidence of extracted depth below a threshold (e.g., which may indicate a detected 3D surface topology that relies on extracted depth below would be less accurate), detected operation scenario (e.g., enabling a detected 3D surface topology in off-road driving in some implementations in which the 3D bowl model assumes a flat ground, enabling a detected 3D surface topology in a parking scenario in some implementations in which it is may be expected to generate better visualizations at lower speeds), detected or predicted amount of occlusions (e.g., which may indicate a bowl visualization that stretches image data to cover holes during texturization would provide a better visualization), a selected or applicable viewport (e.g., virtual camera placement orientation) or corresponding type of visualization, the available of sensor data from preceding time slice(s) (e.g., in some embodiments that generate a visualization such as a top down view or others that rely on a detected 3D surface topology generated using sensor data from preceding time slice), operator selection, and/or other factors (e.g., such as combinations thereof). Example features that may be used to enable one or more simulated visualizations (e.g., with a simulated representation of environmental parts such as nearby lanes and/or detected objects such as nearby vehicles or pedestrians) include detecting an object (e.g., pedestrian) between the ego-machine and virtual camera (e.g., since texturizing can render the a mirror image of the object), detecting a partially occluded object (e.g., rendering a 3D asset simulating a corresponding class of object to represent the occluded object instead of rendering the partially observed object), ego-machine speed above some threshold (e.g., indicative of highway speeds), and/or others (e.g., such as combinations thereof).

Taking an example implementation that uses detected speed and detected proximity to detected objects to enable or disable one or more visualizations that rely on a 3D bowl model (bowl visualizations) and/or that rely on a detected 3D surface topology (e.g., surface topology visualization), when the detected speed of the vehicle is below a designated speed threshold (e.g., less than 8-10 kilometers per hour (km/hr)) and the closest detected object is closer to the vehicle than some threshold proximity (e.g., less than 3 m), the surface topology visualization may be enabled (e.g., for display or user selection). By contrast, when the speed of the vehicle is above a speed threshold and there are no detected objects within the threshold proximity, the bowl visualization may be enabled. In some embodiments, when detected objects are less than a threshold distance (e.g., less than 1 m) from the ego-machine, raw image data (e.g., an image/video feed generated using the cameras of the ego-machine) is enabled. In some embodiments, when the speed of the vehicle is above a speed threshold (e.g., 35 km/hr), a simulated visualization (e.g., a visualization with a simulated representation of nearby lanes and/or simulated assets corresponding to detected objects (e.g., cars, trucks, motorcycles, pedestrians, and/or others) is enabled for display.

In an example data flow, input images from one or more cameras of an ego-machine (e.g., a vehicle) may be used to visualize the environment surrounding the ego-machine using a plurality of supported environmental modeling techniques and/or view directions. For example, a display visible to an operator and/or occupant of the ego-machine may present different visualizations of the environment generated from the perspective of a virtual camera positioned and/or oriented with different viewing directions (e.g., side view, top down view, front facing view, rear facing view, under ego-machine view, and/or others), and/or may present some indication of which views are available for selection. In certain detected scenarios, visualizations from one or more of the different viewing directions may be generated (or made available for selection) as surface topology visualizations and, in certain detected scenarios, visualizations from one or more of the different viewing directions may be generated (or made available for selection) as bowl visualizations. In an example embodiment, a bowl visualization (e.g., a side view generated using an environmental modeling pipeline that models the surrounding environment as a 3D bowl) may be automatically displayed or made available for selection as a default visualization for one or more viewing directions (e.g., or all available viewing directions). In some implementations, the bowl visualization is used as the default visualization because it is less computationally expensive to generate than other supported techniques, and should typically generate high quality visualizations in most scenarios. Upon the detection of one or more designated scenarios (e.g., a parking scenario, estimated or predicted image quality of a surface topology visualization above a threshold value), a surface topology visualization (e.g., a view generated using an environmental modeling pipeline that models the surrounding environment as a detected 3D surface topology) may be automatically displayed or made available for selection. In this regard, in certain scenarios (e.g., in which a surface topology visualization may provide a better visualization), the surface topology visualization may be enabled. For example, in a scenario where a pedestrian is detected in proximity to the ego-machine (e.g., within one to two meters (m)), the surface topology visualization may be enabled (e.g., since a bowl visualization may represent the pedestrian with distortion, or may not represent the pedestrian at all).

Examples of scenarios in which the surface topology visualization may be generated, displayed, and/or made available for selection include: detection of a designated class of object (e.g., a pedestrian); detection of an object (e.g., or a type of object, such as a car, objects above a threshold size, for example, a curb above a threshold height, and/or others) within a threshold distance of the ego-machine (e.g., within two or three meters of the ego-machine); detection of an off-road scenario (e.g., based on an enabled driving mode inferred, for example, based on detection of an object that is on the driving surface and has a detected height within a threshold height range, which may indicate a large obstacle that can be driven over); detection or prediction of a parking scenario, such as entering or exiting a parking space, parallel parking, etc. (e.g., based on an operator input such as one instructing an automatic parking operation or selecting a parking spot on a display), detection of the speed of ego-motion below a designated threshold such as 8-10 km/hr, predicted driver intent to park, a detected trajectory, detecting there is an open parking spot, detecting one or more driver actions such as signaling or changing gears, detecting the ego-machine driving in reverse, and/or some combination thereof, etc.); some measure of indication an estimated or predicted image quality of the resulting visualization (e.g., less than some number, amount, or coverage of occlusions, at least some threshold confidence of extracted depth values represented by the 3D model of the surrounding environment); selection and/or preferences of the operator of the ego-machine (e.g., for a surface topology visualization); and/or others (e.g., such as combinations thereof).

Examples of scenarios in which a bowl visualization may be generated, displayed, and/or made available for selection include: by default, detected objects (e.g., or certain types of objects, such as cars or objects above a threshold size) beyond some threshold distance from the ego-machine (e.g., two or three meters); detection of an on-road driving scenario (e.g., based on an enabled driving mode, inferred for example based on no detected objects above a threshold height on the driving surface); detection of the speed of ego-motion above a designated threshold (e.g., 8-10 km/hr); some indication that a surface topology visualization may not provide an improved visualization (e.g., more than some number, amount, or coverage of occlusions, less than some threshold confidence of extracted depth values); selection and/or preferences of the operator of the ego-machine (e.g., for a bowl visualization); and/or others (e.g., such as combinations thereof). In some embodiments, a bowl visualization is always available to be selected for display.

The state of the ego-machine (e.g., detected proximity to detected objects; detected operational scenario in which the ego-machine is operating or predicted to begin operating; speed of ego-motion; and/or others) may be determined using any suitable technique. For example, in some embodiments, one or more sensors (e.g., cameras, RADAR sensors, LiDAR sensor, ultrasonic sensors) of an ego-machine may be used to generate sensor data representing an environment surrounding the ego-machine, and any known object detection and/or tracking technique may be used to detect proximate objects (e.g., mobile obstacles or a subclass thereof such as a vehicles, pedestrians, and/or others) and estimate their positions in the environment (e.g., relative to the ego-machine) based on the sensor data. In some embodiments, detected or predicted depth values corresponding to input images generated using cameras of the ego-machine to determine the proximity of the ego-machine to detected objects represented in the images. In some embodiments, one or more operational scenarios may be designated, and any known technique may be used to detect one or more features indicative of a designated operational scenario. For example, detectible features that may be indicative of a parking scenario include the presence of parking lines or spaces, nearby stationary vehicles, proximity to buildings or structures, reduced traffic flow, reduced speed or deceleration of the ego-machine, detected operator intent (e.g., based on eye movement, gaze direction, facial expressions, steering patterns, and/or others), and/or others. Detectible features that may be indicative of an off-road driving scenario include the absence of road markings, rough terrain, uneven surfaces, vegetation, obstacles such as rocks or trees, engagement of off-road driving modes, suspension adjustments, and/or others.

The estimated or predicted image quality of a visualization (e.g., the number, amount, and/or coverage of occlusions; the confidence of corresponding depth estimates; and/or others) may be determined using any known technique and/or any suitable metric. For example, if a measure of the number, size, or (e.g., percent) coverage of occluded regions in image data used for texturizing a visualization is above a designated threshold value, the surface topology visualization may be disabled. In some embodiments, a simulated representation of a detected object (e.g., a 3D model representing a generic pedestrian) may be inserted into a visualization in place of real image data in various circumstances (e.g., based on a determination that the detected object is occluded, located between the ego-machine and the virtual camera, and/or others). For example, if an object (e.g., a pedestrian) is detected and the object can be rendered in a photorealistic manner (e.g., the quality of the object rendering is above a threshold value), the object may be rendered in a photorealistic manner (e.g., based on real image data showing a pedestrian's face). If the object cannot be rendered in a photorealistic manner (e.g., the quality of the object rendering is below a threshold value, for example, because only half of the pedestrian is depicted in the input image(s)), a simulated representation of the object may be inserted into the visualization instead of rendering the object based on real image data. For example, a simulated asset (e.g., a 3D mannequin of a person, a 3D model of a car, or other simulated model) may be inserted into the 3D model of the environment or the corresponding 2D visualization to replace the object in the visualization. As another example, content generated by a generative-artificial intelligence model may be inserted into the 3D model of the environment or the corresponding 2D visualization to replace the object in the visualization. The quality of the object rendering (e.g., confidence to render an object in a photorealistic manner) may be determined by any known technique and/or using any suitable metric.

In some embodiments, particular viewing directions of surface topology visualizations may be enabled for display in certain scenarios before other viewing directions of surface topology visualizations are enabled for display. For example, a top down view of a surface topology visualization of the ego-machine may be enabled for display after a certain amount of historical image data is received in order to provide a visualization above a threshold image quality (e.g., below a threshold amount of occlusions in the visualization). As another example, a rim view visualization of a surface topology visualization of the ego-machine may be enabled for display upon detection of a designated operational scenario or selection by the operator of the ego-machine, as the rim view visualization may generate a visualization above a threshold image quality without requiring historical image data.

As such, the techniques described herein may be used to determine whether to generate a bowl visualization and/or a surface topology visualization based on detectible factors, such as one or more features of the state of the ego-machine, some measure of the estimated or predicted image quality of the visualization, and/or others. Determining whether to generate a bowl visualization and/or a surface topology visualization facilitates providing the best visualization (e.g., that reduces or avoid visual artifacts like scale magnifications, object disappearance, and occlusions) in different detected scenarios, thereby improving the quality of the visualization and the ability of an operator to safely navigate through the environment. Further, determining to selectively enable a surface topology visualization (e.g., using a neural renderer) in certain scenarios reduces the computation expenses that would otherwise be required to generate that type of visualization more frequently. As such, the techniques described herein may be used to reduce visual artifacts, enhance the safe operation of the vehicle, and/or improve processing speed by selectively enabling different environmental modeling techniques to support visualization generation in different scenarios.

Example Environment Visualization Pipeline

With reference to FIG. 1, FIG. 1 is an example environment visualization pipeline 100, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionalities to those of example autonomous vehicle 500 of FIGS. 5A-5D, example computing device 600 of FIG. 6, and/or example data center 700 of FIG. 7.

As a high level overview, the environment visualization pipeline 100 may be incorporated into or otherwise associated with an ego-machine (e.g., as a surround view system of the ego-machine), such as the autonomous vehicle 500 of FIGS. 5A-5D. The environment visualization pipeline 100 may include any number and type of sensor(s) 101 (e.g., one or more cameras) that may be used to generate sensor data (e.g., image data 105) representing the surrounding environment. The environment visualization pipeline 100 may include an environment visualization generator 111 that uses the image data 105 to generate an environment visualization representing the surrounding environment, and/or provide it to on a display 180 visible to an occupant or operator of the ego-machine (e.g., a driver or passenger). Additionally or alternatively, the environment visualization pipeline 111 may stream the environment visualization, the sensor data, and/or some other representation of the environment in and/or around the ego-machine to a remote location.

Figure 3B:
FIG. 3B is an example frame representing a front camera view, in accordance with some embodiments of the present disclosure.
Figure 3D:
FIG. 3D is an example frame representing a right camera view, in accordance with some embodiments of the present disclosure.
Figure 3A:
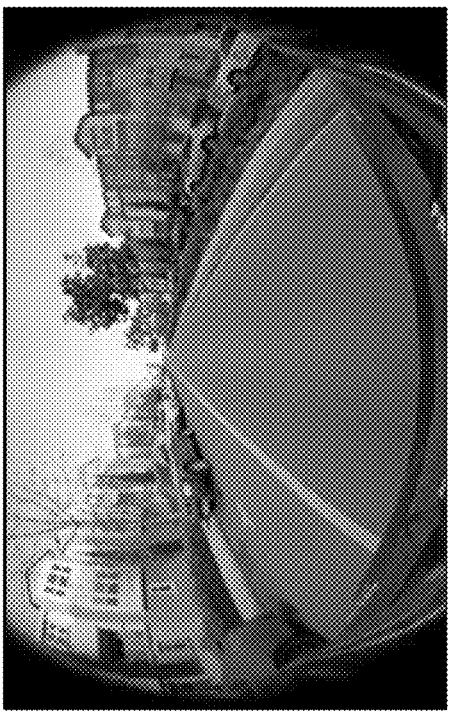
FIG. 3A is an example frame representing a rear camera view, in accordance with some embodiments of the present disclosure.
Figure 3C:
FIG. 3C is an example frame representing a left camera view, in accordance with some embodiments of the present disclosure.

In an example embodiment, an ego-machine (e.g., the autonomous vehicle 500 of FIGS. 5A-5D) is equipped with any number and type of sensor(s) 101 (e.g., one or more cameras, such as fisheye cameras), and the sensor(s) 101 may be used to generate frames of overlapping sensor data (e.g., overlapping image data) for each time slice. Generally, any suitable sensor may be used, such as one or more of the stereo camera(s) 568, wide-view camera(s) 570 (e.g., fisheye cameras), infrared camera(s) 572, surround camera(s) 574 (e.g., 360° cameras), and/or long-range and/or mid-range camera(s) 598, of the vehicle 500 of FIG. 5A. Sensor data may be aligned using any known technique. In an example configuration, four fisheye cameras are installed at the front, left, rear and right side of a vehicle, where surrounding videos are continuously captured (e.g., once for each time slice). An example frame of image data representing a rear camera view 300A is shown in FIG. 3A. An example frame of image data representing a front camera view 300B is shown in FIG. 3B. An example frame of image data representing a left camera view 300C is shown in FIG. 3C. An example frame of image data representing a right camera view 300D is shown in FIG. 3D. Ego-motion of the vehicle may be generated (e.g., via speed detector 143) using any known technique and synchronized with timestamps of the frames (e.g., images) of the videos. For example, absolute or relative ego-motion data (e.g., location, orientation, positional and rotational velocity, positional and rotational acceleration) may be determined via speed detector 143 using a vehicle speed sensor, gyroscope, accelerator, inertial measurement unit (IMU), and/or others.

In some embodiments, an environmental modeling pipeline 113 of the environment visualization generator 111 (e.g., of the ego-machine) may support the use of a plurality of environmental modeling techniques to generate different types of visualizations of the surrounding environment in different scenarios (e.g., as determined by an environmental modeling pipeline selection component 120), for example, based on the benefits of using each of the plurality of environmental modeling techniques in the different scenarios. For example, the environment visualization genera-tor 111 may support an environmental modeling pipeline (e.g., provided by a detected 3D surface topology modeling pipeline 117) that models the surrounding environment as a detected 3D surface topology when generating a visualization (e.g., in certain scenarios, such as lower speed of ego-motion, detected objects within a threshold distance, and/or others), and/or an environmental modeling pipeline (e.g., provided by a 3D bowl modeling pipeline 115) that models the surrounding environment as a 3D bowl when generating a visualization in other scenarios (e.g., in other scenarios, such as higher speed of ego-motion, no detected objects within a threshold distance, and/or others). Visualizations may be generated (e.g., by a view generator 170) from different viewing directions (e.g., 2D images of the environmental model may be generated from the perspective of a virtual camera positioned and oriented in different ways a 3D scene to provide various perspectives such as a side view relative to the ego-machine, a top down view, a front facing view relative to the ego-machine, a rear facing view relative to the ego-machine, under ego-machine view, and/or others) using the corresponding environmental modeling pipeline selected for the detected scenario. Examples of different types of visualizations representing different viewing directions and example environmental modeling pipelines are shown in FIGS. 3E-3P, as explained in more detail below.

In some implementations and/or scenarios, the environmental modeling pipeline 113 may implement a 3D bowl modeling pipeline 115 to model the surrounding environment as a 3D bowl. Generally, the 3D bowl modeling pipeline 115 may use any known technique to model the surrounding environment as a 3D bowl, a texture mapping component 160 may texturize or otherwise apply a graphical representation of visual elements (e.g., colors, images, designs, patterns, etc.) to the 3D bowl using corresponding sensor data (e.g., (e.g., image data 105 from different cameras of the ego-machine), and the view generator 170 may render a view of the texturized 3D bowl. Examples of bowl visualizations which may be generated by modeling the surrounding environment as a 3D bowl are shown in FIGS. 3E, 3G, 3I, and 3K.

In some implementations and/or scenarios, the environmental modeling pipeline 113 may implement a detected 3D surface topology modeling pipeline 117 to model the surrounding environment as a detected 3D surface topology. For example, and as described in more detail in U.S. Provisional Application No. 63/565,885, the contents of which are incorporated by reference herein, in order to visualize the environment surrounding an ego-machine, the detected 3D surface topology modeling pipeline 117 may extract one or more depth maps from sensor data (e.g., the image data 105) and convert the depth map(s) into a detected 3D surface topology of the surrounding environment, and the texture mapping component 160 may texturize or otherwise apply a graphical representation of visual elements (e.g., colors, images, designs, patterns, etc.) to the detected 3D surface topology using the sensor data. The detected 3D surface topology generated by detected 3D surface topology modeling pipeline 117 may model the geometry of the surrounding environment as a 3D surface using a (e.g., truncated) SDF that encodes the distance of each voxel in a 3D grid to the 3D surface topology extracted from the one or more depth maps. The detected 3D surface topology modeling pipeline 117 may extract a 3D surface representation of the detected 3D surface (e.g., a 3D mesh) from the detected 3D surface topology and may smooth the detected 3D surface topology and/or the 3D surface representation using any known technique. As such, the texture mapping component 160 may back-project the sensor data (e.g., the image data 105) onto the 3D surface representing the detected 3D surface topology (e.g., the 3D surface mesh) using corresponding depth values (e.g., derived from the smoothed or unsmoothed 3D surface representation, rendered using unstructured lumigraph rendering, etc.) in each back-projection to generate a texturized 3D surface. As such, the view generator 170 may generate a surface topology visualization by rendering a view of the texturized 3D surface. In some embodiments, the view generator may generate a view (e.g., a 2D image with placeholder pixels for range or color values) of the untexturized detected 3D surface topology (or other model of the surrounding environment), project one or more depth values into the 2D view (e.g., generating a corresponding depth map), and texturize or otherwise apply a graphical representation of visual elements (e.g., colors, images, designs, patterns, etc.) to the 2D view using corresponding (e.g., per-pixel) depth values. Examples of surface topology visualizations which may be generated by modeling the surrounding environment as a detected 3D surface topology are shown in FIGS. 3F, 3H, 3J, 3L, 3M, and 3N.

In some implementations and/or scenarios, the detected 3D surface topology modeling pipeline 117 may represent the detected 3D surface topology as a (e.g., featurized) point cloud and the view generator 170 may generate a visualization (e.g., a surface topology visualization) of an environment using the detected 3D surface topology to model the environment. For example, the detected 3D surface topology modeling pipeline 117 may apply a representation of sensor data (e.g., image data 105) one or more neural networks to extract corresponding depth map(s), and the detected 3D surface topology modeling pipeline 117 may featurize the depth map(s) (e.g., by assigning each pixel in the depth map a color from a corresponding pixel of an input image). The detected 3D surface topology modeling pipeline 117 may uplift the featurized depth map(s) to generate and/or featurize a (e.g., sparse) point cloud representing the detected 3D surface topology of the surrounding environment (e.g., where each point of the featurized point cloud carries a color value from the corresponding pixel of image data). As such, the view generator 170 may generate a surface topology visualization by rendering a view of the featurized point cloud, and/or applying the resulting (e.g., sparse) image to a neural render to densify and generate a photorealistic image. Any known neural rendering technique may be used by view generator 170 to densify an image. In some embodiments, the surface topology modeling pipeline 117 and/or the 3D bowl modeling pipeline 113 may use any known hole filling technique to identify and fill in holes in a corresponding 3D model of the surrounding environment.

In some embodiments, the environmental modeling pipeline 113 may additionally or alternatively support other environmental modeling techniques, such as any known view synthesis or view generation techniques, to generate corresponding visualizations based on a corresponding supported environmental modeling pipeline.

The texture mapping component 160 may project and/or texturize a 3D representation of the environment generated by the environmental modeling pipeline 113. In some embodiments, to perform texturizing, the texture mapping component 160 back-projects 2D points in pixel coordinates to 3D points using corresponding depth values obtained from the detected 3D surface topology (e.g., an SDF, an extracted surface mesh), from a sensed or extracted depth map (e.g., generated using LiDAR or RADAR sensor(s), using one or more neural networks, etc.), and/or otherwise. With the image data assigned to corresponding 3D points, the texture mapping component 160 may project the 3D points, for example, onto a 3D surface representation of the 3D surface topology to generate a texturized 3D surface topology. As such, in some embodiments, the texture mapping component 160 may back-project sensor data (e.g., the image data 105) from the sensor(s) 101 onto the 3D surface representation of the detected 3D surface topology using corresponding depth values (e.g., represented by the smoothed or unsmoothed 3D surface representation, rendered using unstructured lumigraph rendering, etc.) in each back-projection to generate a texturized 3D surface. In some embodiments (e.g., in which depth values are extracted from a current and/or prior time slices), textures may be backwards warped from corresponding frames of image data from any number of sensor(s) 101 and/or corresponding time slices. In some implementations, regions that are not covered by the texture may be determined to be outdated or stale. As such, the texture mapping component 160 may cover detected outdated or stale regions and/or may otherwise represent such regions using blurring. Additionally or alternatively, the texture mapping component 160 may texturize the 3D surface topology using frames of image data representing one or more previous time slices, and may represent potentially stale or outdated regions by desaturating colors, applying a tint, and/or any other texturing technique The view generator 170 may render a view of a (e.g., texturized) 3D model of the surrounding environment generated by the environmental modeling pipeline 113 (e.g., a detected 3D surface topology model generated by the detected 3D surface topology modeling pipeline 117, a 3D bowl model generated by the 3D bowl modeling pipeline 115) to generate a corresponding visualization (e.g., a surface topology visualization, a bowl visualization, etc.). For example, the view generator 170 may position and orient a virtual camera in a 3D scene with 3D model of the surrounding environment and may render a view of the 3D model from the perspective of the virtual camera through a corresponding viewport. In some embodiments, the viewport may be selected based on a driving scenario (e.g., orienting the viewport in the direction of ego-motion), based on a detected salient event (e.g., orienting the viewport toward the detected salient event), based on an in-cabin command (e.g., orienting the viewport in a direction instructed by a command issued by an operator or occupant of the ego-machine), based on a remote command (orienting the viewport in a direction instructed by a remote command), and/or otherwise. As such, the view generator 170 may output a visualization (e.g., a surround view visualization, third-person view, bay view, rim protection view, side view, top down view, front facing view, rear facing view, under ego-machine view, and/or others) of the surrounding environment, for example, via the display 180 (e.g., a monitor visible to an occupant or operator of the ego-machine).

In some embodiments, the environmental modeling pipeline selection component 120 select or switch between supported environmental modeling techniques (e.g., implemented by the 3D bowl modeling pipeline 115 and the detected 3D surface topology modeling pipeline 117). In some embodiments, the environmental modeling pipeline selection component 120 includes an environmental model-toggling state machine 150 that implements the decision-making logic for selecting and/or switching between the supported environmental modeling techniques. Switching and/or selection may be based on any number of detectible factors, such as a state of the ego-machine (e.g., proximity to a detected pedestrian; proximity to detected objects; one or more detected features indicative of a designated operational scenario, such as parking scenarios or off-road scenarios; speed of ego-motion; and/or others) determined by the ego-machine state detection component 140; an estimated or predicted image quality of a corresponding visualization (e.g., which may be based on confidence of corresponding depth estimates used to generate the visualization) determined by an estimated image quality module 146; selections and/or preferences of the operator of the ego-machine looked up from a corresponding profile by a selection/preference module 147; and/or others.

Figure 2:
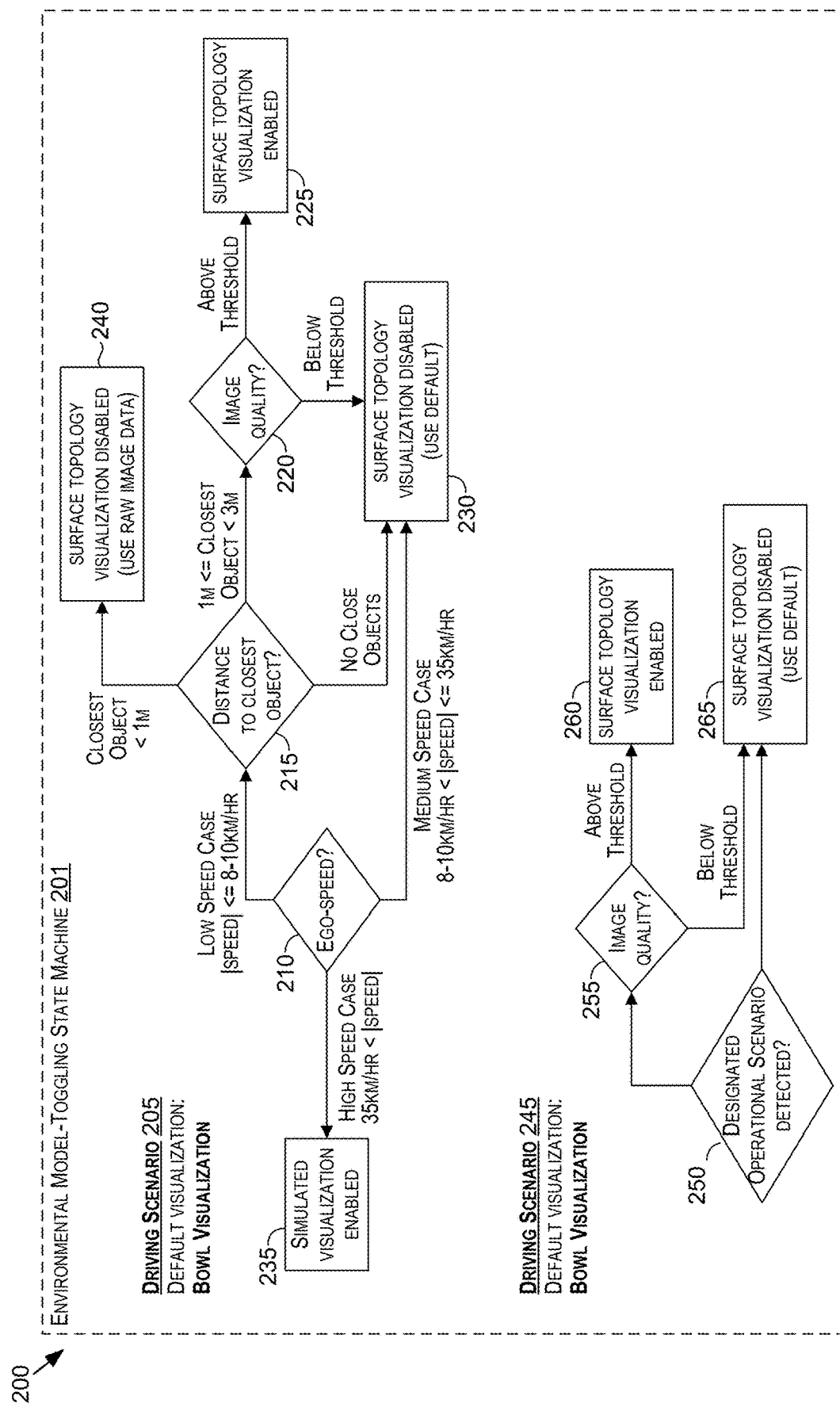
FIG. 2 is an example environmental model-toggling state machine, in accordance with some embodiments of the present disclosure.

In some embodiments, the environmental model-toggling state machine 150 implements a decision tree that determines whether to use the 3D bowl modeling pipeline 115, the detected 3D surface topology component 116, and/or some other modeling technique. FIG. 2 is a diagram 200 of an example environmental model-toggling state machine 201, which may correspond to the environmental model-toggling state machine 150 of FIG. 1. The environmental model-toggling state machine 201 includes an example driving scenario 205 that is activated by default, based on a determination that an ego-machine is in motion, based on a display (e.g., the display 180 of FIG. 1) or a particular display interface being active, based on a selection of an option to view a particular visualization, and/or otherwise. In this example, the environmental model-toggling state machine 201 enables one or more bowl visualizations that are supported by a 3D bowl model of the surrounding environment (e.g., generated by the 3D bowl modeling pipeline 115 of FIG. 1) by default. In this example scenario, at block 210, ego-speed is determined (e.g., via speed detector 143 of FIG. 1). If ego-speed is below a lower speed threshold (e.g., less than 8-10 km/hr), at block 215, the environmental model-toggling state machine 201 determines or accesses the distance to the closest object (e.g., via object detector 142 of FIG. 1, as explained in more detail below). If the distance to the closest object is within some threshold proximity (e.g., from 1 m to 3 m), at block 220, the environmental model-toggling state machine 201 determines the estimated or predicted image quality of a corresponding surface topology visualization(s) (e.g., via estimated image quality module 146 of FIG. 1, as explained in more detail below). If the estimated or predicted image quality of the corresponding surface topology visualization(s) is above a threshold quality, the environmental model-toggling state machine 201 enables generating the surface topology visualization(s) (e.g., using detected 3D surface topology modeling pipeline 117 of FIG. 1) at block 225.

Returning to block 220, if the estimated or predicted image quality of the corresponding surface topology visualization(s) is below a threshold quality, the environmental model-toggling state machine 201 disables generating the surface topology visualization(s) in favor of the bowl visualization(s) (e.g., as generated using 3D bowl modeling pipeline 115 of FIG. 1) at block 230. Returning to block 215, if the distance to the closest object is above some threshold proximity (e.g., above 3 m), the environmental model-toggling state machine 201 disables generating the surface topology visualization(s) in favor of the bowl visualization(s) at block 230. Continuing with block 215, if the distance to the closest object is lower than a threshold proximity (e.g., less than 1 m), the environmental model-toggling state machine 201 disables generating the surface topology visualization(s) and/or generating the bowl visualization(s) in favor of raw image data (e.g., an image/video feed generated using the cameras of the ego-machine, for example, as shown in FIGS. 3A, 3B, 3C, and 3D) at block 240. Returning to block 210, if ego-speed is within some speed threshold (e.g., from than 8-10 km/hr to 35 km/hr), the environmental model-toggling state machine 201 disables generating the surface topology visualization(s) in favor of the bowl visualization(s) at block 230. Continuing with block 210, if ego-speed is above some speed threshold (e.g., above 35 km/hr), the environmental model-toggling state machine 201 disables generating the surface topology visualization(s) and/or generating the bowl visualization(s) in favor of a simulated visualization (e.g., a visualization with a simulated representation of nearby lanes and simulated assets corresponding to detected objects (e.g., car, truck, motorcycle, pedestrian, or others)) that is enabled for display via display 180 at block 235.

In some embodiments, the environmental model-toggling state machine 201 includes a driving scenario 245 that is activated by default, based on a determination that the speed of an ego-machine is within some speed threshold (e.g., from than 8-10 km/hr to 35 km/hr), based on a display (e.g., the display 180 of FIG. 1) or a particular display interface being active, based on a selection of an option to view a particular visualization, and/or otherwise. In this example, the environmental model-toggling state machine 201 enables one or more bowl visualizations that are supported by a 3D bowl model of the surrounding environment (e.g., generated by the 3D bowl modeling pipeline 115 of FIG. 1) by default. In this example scenario, at block 250, the environmental model-toggling state machine 201 determines whether a designated operational scenario is present (e.g., via the operational scenario detector 144 of FIG. 1, as explained in more detail below). If a designated operational scenario for a surface topology visualization(s) (e.g., a parking or off-road scenario) is detected, at block 255, the environmental model-toggling state machine 201 determines a measure of the estimated or predicted image quality of a corresponding surface topology visualization(s), as explained in more detail below. If the measure of the estimated or predicted image quality of the surface topology visualization(s) is above a threshold, the environmental model-toggling state machine 201 enables generating the surface topology visualization(s) (e.g., using detected 3D surface topology modeling pipeline 117 of FIG. 1) at block 260. Returning to block 255, if the measure of the estimated or predicted image quality of the corresponding surface topology visualization(s) is below a threshold quality, the environmental model-toggling state machine 201 disables generating the surface topology visualization(s) in favor of the bowl visualization(s) at block 265. Returning to block 250, if a designated operational scenario for a bowl visualization is detected (e.g., non-parking scenario, driving within threshold speed range, etc.), the environmental model-toggling state machine 201 enables the bowl visualization(s) at block 265.

Returning to FIG. 1, in an example data flow, (e.g., the view generator 170 of) the environment visualization generator 111 may use sensor data (e.g., the image data 105) from the sensor(s) 101 (e.g., one or more cameras of an ego-machine) to generate and/or enable one or more visualizations of the environment surrounding an ego-machine from any suitable viewing direction. For example, the view generator 170 may generate a visualization (e.g., a textured 3D model of the surrounding environment) from the perspective of a virtual camera positioned and/or oriented in a corresponding 3D scene with a designated different viewing direction (e.g., a side view relative to the ego-machine, top down view, front facing view relative to the ego-machine, rear facing view relative to the ego-machine, under ego-machine view, and/or others), and/or the view generator 170 may cause the display 180 to present the visualization, or some indication of which views are available for selection.

Figure 3F:
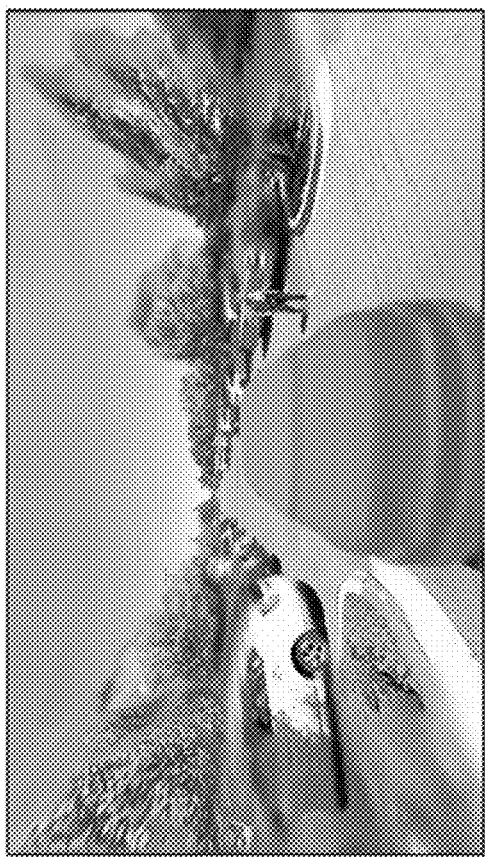
FIG. 3E is an example bowl visualization from a viewing direction of a third-person view and FIG. 3F is an example surface topology visualization from the viewing direction of the third-person view of FIG. 3E, in accordance with some embodiments of the present disclosure.
Figure 3E:
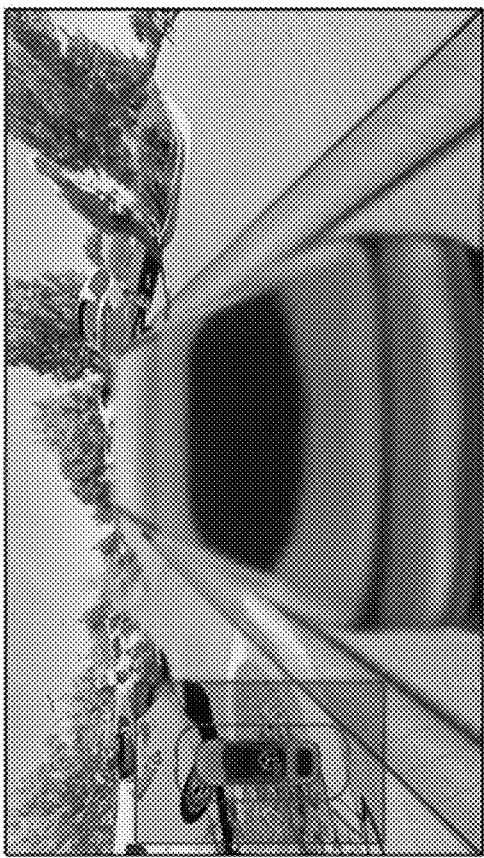

Examples of different types of visualizations from different viewing directions generated using example environmental modeling pipelines are shown in FIGS. 3E-3P. An example bowl visualization 300E (e.g., which may be generated using the 3D bowl modeling pipeline 115 of FIG. 1) from a third-person (e.g., perspective) view is shown in FIG. 3E. An example surface topology visualization 300F (e.g., which may be generated using the detected surface topology modeling pipeline 117) with a third-person (e.g., perspective) view is shown in FIG. 3F. In this example, the surface topology visualization 300F of FIG. 3F provides less distortion in certain regions (e.g., pedestrian, curbs, cars, etc.) than the bowl visualization 300E of FIG. 3E.

Figure 3H:
FIG. 3G is an example bowl visualization from a viewing direction of a bay view and FIG. 3H is an example surface topology visualization from the viewing direction of the bay view of FIG. 3G, in accordance with some embodiments of the present disclosure.
Figure 3G:
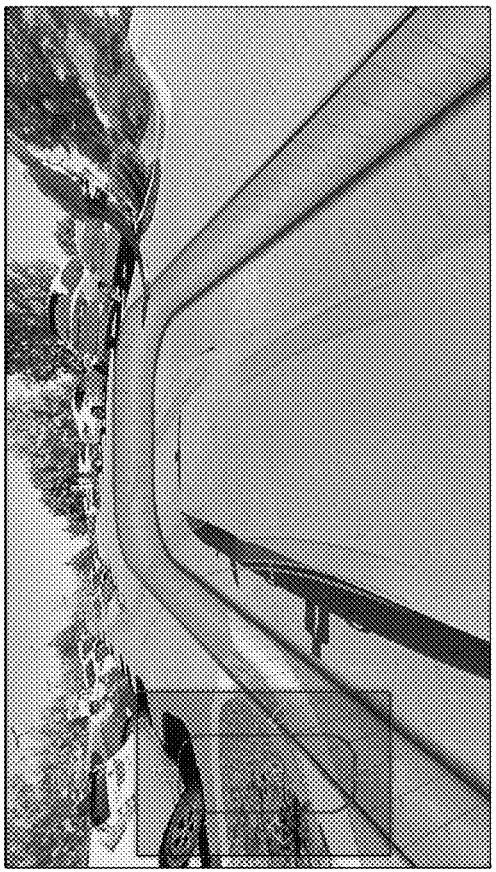

An example bowl visualization 300G (e.g., which may be generated using the bowl visualization modeling pipeline 115 of FIG. 1) from a bay view is shown in FIG. 3G. An example surface topology visualization 300H (e.g., which may be generated using the detected surface topology modeling pipeline 117 of FIG. 1) from a bay view is shown in FIG. 3H. In this example, the surface topology visualization 300H of FIG. 3H provides less distortion in certain regions (e.g., pedestrian, curbs, cars, etc.) than the bowl visualization 300G of FIG. 3G.

Figure 3J:
FIG. 3I is an example bowl visualization from a viewing direction of a rim protection view and FIG. 3J is an example surface topology visualization from the viewing direction of the rim protection view of FIG. 3I, in accordance with some embodiments of the present disclosure.
Figure 3I:
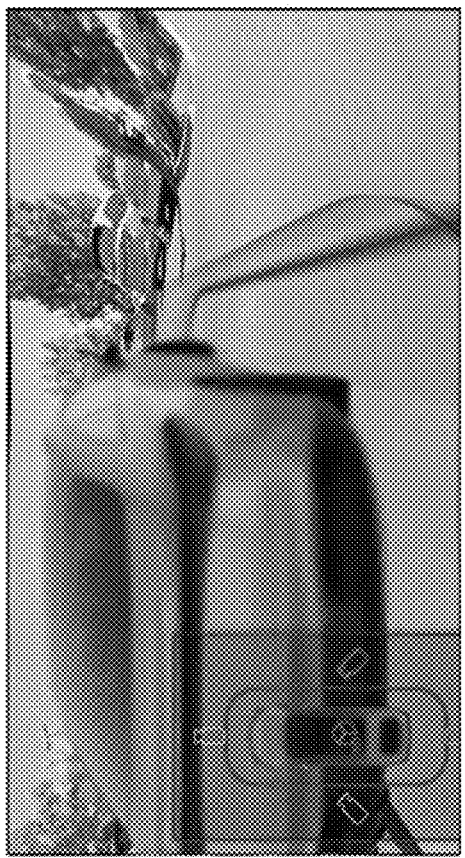

An example bowl visualization 300I (e.g., which may be generated using the bowl visualization modeling pipeline 115 of FIG. 1) from a rim protection view is shown in FIG. 3I. An example surface topology visualization 300J (e.g., which may be generated using the detected surface topology modeling pipeline 117 of FIG. 1) from a rim protection view is shown in FIG. 3J. In this example, the surface topology visualization 300J of FIG. 3J provides less distortion in certain regions (e.g., pedestrian, curbs, cars, etc.) than the bowl visualization 300I of FIG. 3I.

Figure 3L:
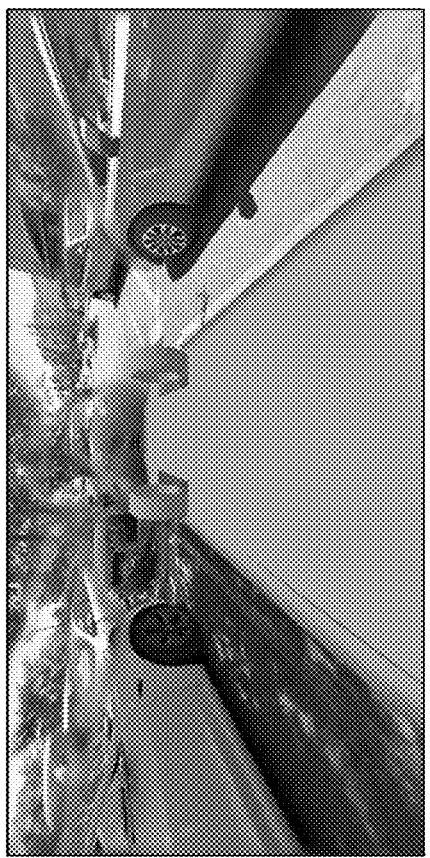
FIG. 3K is an example bowl visualization from a viewing direction of a bay view in a parking spot and FIG. 3L is an example surface topology visualization from the viewing direction of the bay view in the parking spot of FIG. 3K, in accordance with some embodiments of the present disclosure.
Figure 3K:
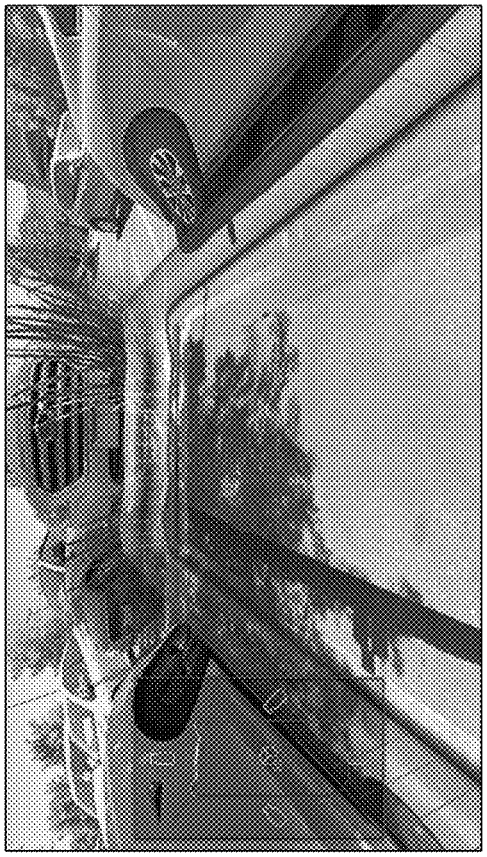

An example bowl visualization 300K (e.g., which may be generated using the bowl visualization modeling pipeline 115 of FIG. 1) from a bay view in a parking spot is shown in FIG. 3K. An example surface topology visualization 300L (e.g., which may be generated using the detected surface topology modeling pipeline 117 of FIG. 1) from a bay view in a parking spot is shown in FIG. 3L. In this example, the surface topology visualization 300L of FIG. 3L provides less distortion in certain regions (e.g., parking space, cars, etc.) than the bowl visualization 300K of FIG. 3K.

Figure 3N:
FIG. 3N is an example surface topology visualization from a viewing direction of a top down view, in accordance with some embodiments of the present disclosure.
Figure 3M:
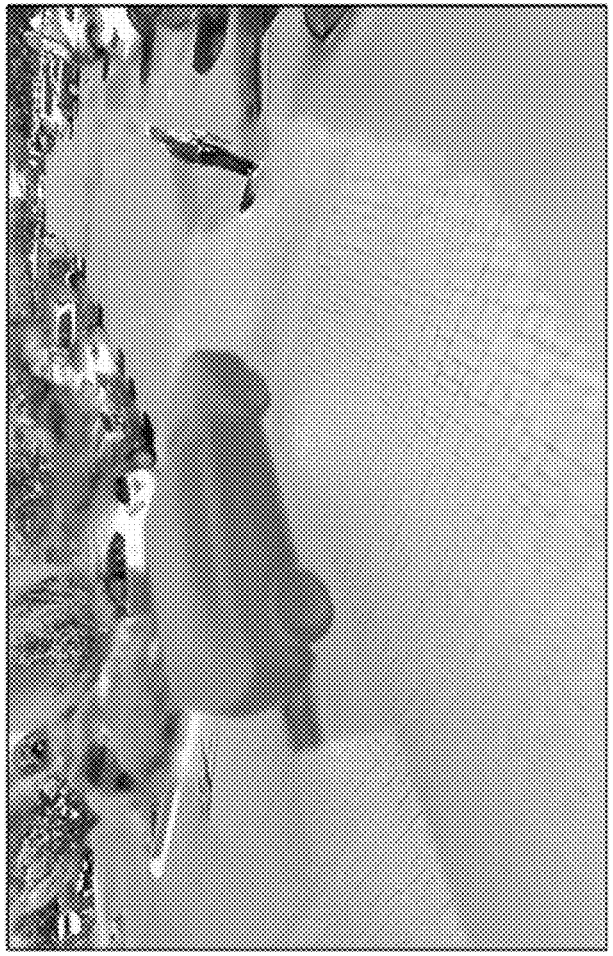
FIG. 3M is another example surface topology visualization from a viewing direction of a third-person view, in accordance with some embodiments of the present disclosure.

Additional examples of surface topology visualizations are shown in FIGS. 3M-3N. An example surface topology visualization 300M (e.g., which may be generated using the detected surface topology modeling pipeline 117 of FIG. 1) from a third-person view is shown in FIG. 3M. In this example, the surface topology visualization 300M of FIG. 3M should provide less distortion of the pedestrian than a corresponding bowl visualization. An example surface topology visualization 300N (e.g., which may be generated using the detected surface topology modeling pipeline 117 of FIG. 1) from a top down view is shown in FIG. 3N. In this example, the surface topology visualization 300N of FIG. 3N should provide less distortion of the parking space and the surrounding vehicles in the parking lot than a corresponding bowl visualization. These are just a few examples in which a surface topology visualization may provide a better visualization than a corresponding bowl visualization (e.g., due to inaccurate depth values represented by the bowl visualization, for example, resulting from a mismatch in the flat ground assumption used by the bowl visualization and the surrounding environment). Other examples include a curb view in which a virtual camera may be positioned low to the ground (e.g., under a transparent model of the vehicle) and oriented (e.g., toward the curbside of the vehicle) to focus on the curb and assist with parking or maneuvering in tight spaces, an off-road view in which a virtual camera may be positioned low to the ground (e.g., under a transparent model of the vehicle) and oriented (e.g., toward the direction of travel or detected obstacles) to focus on the topography of the road and assist with off-road maneuvering, and/or other examples.

Returning to FIG. 1, in certain implementations and/or detected scenarios (e.g., detected by the environmental modeling pipeline selection component 120), the visualization(s) from one or more of viewing directions may be generated (or made available for selection) as surface topology visualizations (e.g., using the detected 3D surface topology modeling pipeline 117) and, in certain implementations and/or detected scenarios (e.g., detected by the environmental modeling pipeline selection component 120), the visualization(s) from one or more viewing directions may be generated (or made available for selection) as bowl visualizations (e.g., using the 3D bowl modeling pipeline 117).

In an example embodiment, a bowl visualization (e.g., generated using the 3D bowl modeling pipeline 117) generated by the view generator 170 may be automatically displayed or made available for selection via display 180 as a default visualization for one or more viewing directions (e.g., or all available viewing directions). As such, the environmental modeling pipeline selection component 120 may detection of one or more designated scenarios (e.g., a parking scenario, estimated or predicted image quality of a surface topology visualization above a threshold value), and may use the environmental model-toggling state machine 150 to toggle enablement of one or more visualizations supported by a surface topology visualization (e.g., generated by the detected 3D surface topology modeling pipeline 117) based on the one or more designated scenarios.

Examples of scenarios in which the environmental modeling pipeline selection component 120 may enable a surface topology visualization to be generated, displayed, and/or made available for selection via display 180 include: detection of a designated class of object (e.g., a pedestrian) via perception module 141; detection of an object (e.g., or a type of object, such as a car, objects above a threshold size, for example, a curb above a threshold height, and/or others) within a threshold distance of the ego-machine (e.g., within two or three meters of the ego-machine) via perception module 141; detection of an off-road scenario (e.g., based on an enabled driving mode, inferred for example based on detection of an object that is on the driving surface and has a detected height within a threshold height range, which may indicate a large obstacle that can be driven over) via perception module 141; detection or prediction of a parking scenario via perception module 141, such as entering or exiting a parking space, parallel parking, etc. (e.g., based on an operator input such as one instructing an automatic parking operation or selecting a parking spot on a display, detection of the speed of ego-motion below a designated threshold such as 8-10 km/hr, predicted driver intent to park, a detected trajectory, detecting there is an open parking spot, detecting one or more driver actions such as signaling or changing gears, detecting the ego-machine driving in reverse, some combination thereof, etc.); some measure of indication an estimated or predicted image quality of the resulting visualization (e.g., less than some number, amount, or coverage of occlusions, at least some threshold confidence of extracted depth values represented by the 3D model of the surrounding environment) via estimated image quality module 146; selection and/or preferences of the operator of the ego-machine (e.g., for a surface topology visualization) via selection/preference module 147; and/or others (e.g., such as combinations thereof).

Examples of scenarios in which the environmental modeling pipeline selection component 120 may enable a bowl visualization to be generated, displayed, and/or made available for selection via display 180 includes: by default, detected objects (e.g., or certain types of objects, such as cars or objects above a threshold size) beyond some threshold distance from the ego-machine (e.g., two or three meters) via perception module 141; detection of an on-road driving scenario (e.g., based on an enabled driving mode, inferred for example based on no detected objects above a threshold height on the driving surface) via perception module 141; detection of the speed of ego-motion above a designated threshold (e.g., 8-10 km/hr) via perception module 141; some indication that a surface topology visualization may not provide an improved visualization (e.g., more than some number, amount, or coverage of occlusions, less than some threshold confidence of extracted depth values) via estimated image quality module 146; selection and/or preferences of the operator of the ego-machine (e.g., for a bowl visualization) via selection/preference module 147; and/or others (e.g., such as combinations thereof). In some embodiments, the bowl visualization is always available to be selected for display via display 180.

The environmental modeling pipeline selection component 120 may include an ego-machine state detection component 140 that generates or receives some representation of the state of the ego-machine (e.g., detected proximity to detected objects; one or more detected features indicative of a designated operational scenario in which the ego-machine is operating or predicted to begin operating; speed of ego-motion; and/or others) generated using any known technique. The ego-machine state detection component 140 may detect the state of the ego-machine, or otherwise receive a representation of, the detected state of the ego-machine, for example, from one or more upstream components, such as one or more neural networks. For example, in some embodiments, one or more sensor(s) 101 (e.g., cameras, RADAR sensors, LiDAR sensor, ultrasonic sensors) of an ego-machine may be used to generate sensor data representing an environment surrounding the ego-machine and any known object detection and/or tracking technique may be used (e.g., by an object detector 142 of perception module 141, by one or more upstream components such as one or more neural networks) to detect objects (e.g., mobile obstacles or a subclass thereof such as a vehicles, pedestrians, and/or others) and estimate their positions in the environment (e.g., relative to the ego-machine) based on the sensor data. In some embodiments, object detector 142 may be a component of a perception module 141 and the perception module 141 may be used to for object detection and/or tracking.

The perception module 141 may use any known perception technique, such as any known autonomous vehicle (AV) perception technique. In some embodiments, the perception module 141 may detect or predict depth values corresponding to input images generated using cameras of the ego-machine to determine the proximity of the ego-machine to detected objects represented in the images.

The speed detector 143 of the perception module 141 may use any known technique to determine speed of ego-motion.

For example, the speed detector 143 may determine ego-motion using a vehicle speed sensor, gyroscope, accelerator, IMU, and/or others.

An operational scenario detector 144 of the perception module 141 may use any known technique to detect a designated operational scenario, such as a designated parking or off-road scenario. In some embodiments, the operational scenario detector 144 may be a component of (or may receive one or more signals or other data generated by) a perception module 141. Generally, the operational scenario detector 144 may use any known technique to detect one or more features indicative of a designated operational scenario. For example, the operational scenario detector 144 may determine that a parking scenario (e.g., entering or exiting a parking space, parallel parking) is occurring or about to begin based on detecting one or more features of one or more current operating or operator conditions that may be indicative of a parking scenario, such as the presence of parking lines or spaces, nearby stationary vehicles, proximity to buildings or structures, reduced traffic flow, reduced speed or deceleration of the ego-machine, detected operator intent (e.g., detected by the operator intent module 145 based on eye movement, gaze direction, facial expressions, steering patterns, and/or others), and/or others. In some embodiments, the operational scenario detector 144 may determine that an off-road scenario is occurring or about to begin based on detecting one or more features of one or more current operating or operator conditions that may be indicative of an off-road driving scenario, such as the absence of road markings, rough terrain, uneven surfaces, vegetation, obstacles such as rocks or trees, engagement of off-road driving modes, suspension adjustments, and/or others. These are just a few examples, and any detectible features indicative of any designated operational scenario may be used within the scope of the present disclosure.

In some embodiments, an operator intent module 145 may predict that an operator of an ego-machine intends to engage in a designated operational scenario (e.g., a parking scenario). For example, the operator intent module 145 may be part of (or may communicate with) a driver monitoring system (DMS) that uses any known technique to predict that an operator intends to engage in a designated operational scenario such as a parking scenario, for example, by tracking eye movements, gaze direction, head orientation, hand gestures, facial expressions, steering patterns, and/or otherwise. Continuing with detecting intent to park as an example, the operator intent module 145 (and/or a corresponding DMS) may infer an intention to park based on detecting the operator looking at potential parking spaces, turning their head to check surroundings, and/or reaching for the gear selector or parking brake. As such, some encoded representation of one or more monitored operator features and/or sensor data representing the environment may be used (e.g., by a neural network) to predict the intent to engage in a designated operational scenario based on various interior cues (e.g., observed operator features) and/or exterior cues (e.g., nearby parking spaces).

The estimated image quality module 146 may determine a measure of estimated or predicted image quality of a visualization (e.g., the number, amount, and/or coverage of occlusions; the confidence of corresponding depth estimates; and/or others) using any known technique and/or any suitable metric. For example, if the estimated image quality module 146 determines that a measure of the number, size, or (e.g., percent) coverage of occluded regions in image data used for texturizing a surface topology visualization or in a generated surface topology visualization is above a designated threshold value, the environmental modeling pipeline selection component 120 may disable or determine not enable a surface topology visualization.

In some embodiments, the view generator 170 (or some other component) may insert a simulated representation of a detected object (e.g., a 3D model representing a generic pedestrian) into 3D representation of the surrounding environment and/or a corresponding 2D visualization in place of real image data, for example, based on a determination that the detected object is occluded, located between the ego-machine and the virtual camera, and/or others). For example, if an object (e.g., a pedestrian) is detected and the object can be rendered in a photorealistic manner (e.g., the estimated image quality module 146 determinates that a measure of the quality of the object rendering is above a threshold value), the view generator 170 may render the object in a photorealistic manner (e.g., based on real image data showing a pedestrian's face). If the object cannot be rendered in a photorealistic manner (e.g., the quality of the object rendering is below a threshold value, for example, because only half of the pedestrian is depicted in the input image(s), as determined by estimated image quality module 146), the view generator 170 (or some other component) may insert a simulated representation of the object into the 3D representation of the surrounding environment and/or a corresponding 2D visualization instead of rendering the object based on real image data. For example, the view generator 170 may insert a simulated asset (e.g., a 3D mannequin of a person, a 3D model of a car, or other simulated model) may into the 3D model of the environment or the corresponding 2D visualization to replace the object in the visualization. As another example, content generated by a generative-artificial intelligence model may be inserted into the 3D model of the environment or the corresponding 2D visualization by view generator 170 to replace the object in the visualization. The quality of the object rendering (e.g., confidence to render an object in a photorealistic manner) may be determined using any known technique and/or using any suitable metric (e.g., via estimated image quality module 146).

In some embodiments, the environmental modeling pipeline selection component 120 may enable (e.g., surface topology) visualization(s) corresponding to designated viewing directions in certain scenarios before other viewing directions are enabled. For example, a top down view of a surface topology visualization of the ego-machine may be enabled after a certain amount of historical image data is received in order to provide a visualization above a threshold image quality (e.g., below a threshold amount of occlusions in the visualization). As another example, a rim view visualization of a surface topology visualization of the ego-machine may be enabled for display immediately upon detection of a designated operational scenario or selection by the operator of the ego-machine, as the rim view visualization may generate a visualization above a threshold image quality without requiring historical image data.

In some embodiments, one or more components of the environment visualization generator 111 (e.g., the perception module 141, the estimated image quality module 146, etc.) and/or other components may be implemented using neural network(s) such as a convolutional neural network (CNN), but this is not intended to be limiting. For example, and without limitation, components of the environment visualization generator 111 may include any type of a number of different networks or machine learning models, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, transformer, recurrent, perceptrons, Long/Short Term Memory (LSTM), large language model (LLM), Hopfield, Boltzmann, deep belief, de-convolutional, generative adversarial, liquid state machine, etc.), and/or other types of machine learning models.

Figure 4:
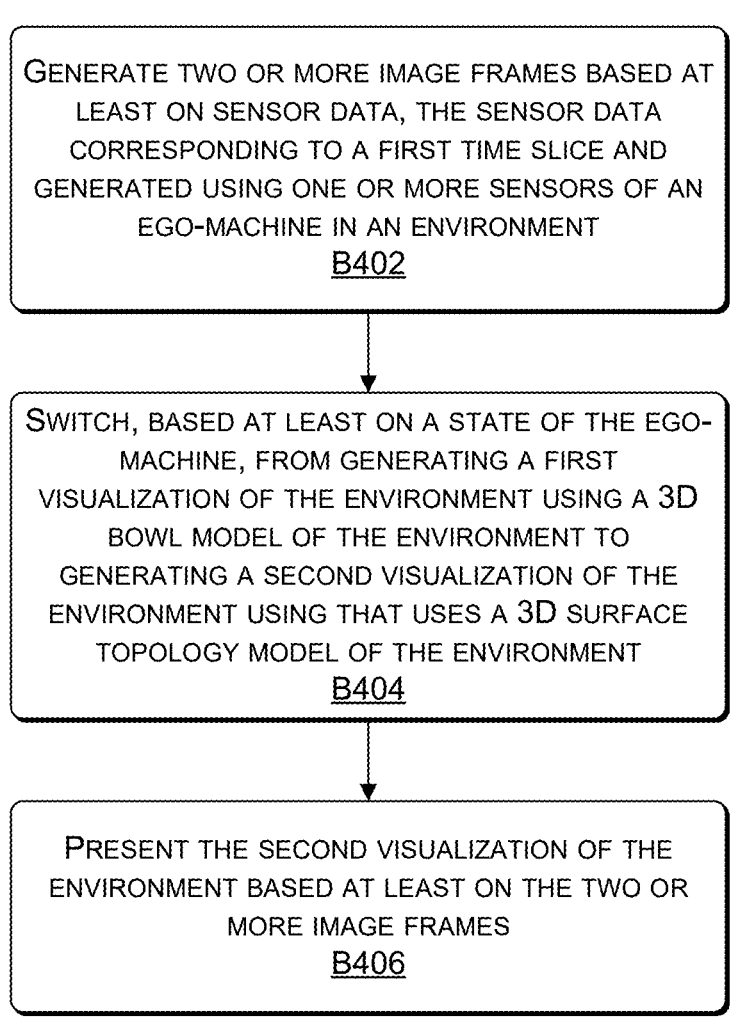
FIG. 4 is a flow diagram showing a method for switching between visualizations, in accordance with some embodiments of the present disclosure.

Now referring to FIG. 4, each block of method 400, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, the method 400 is described, by way of example, with respect to the environment visualization pipeline 100 of FIG. 1. However, these methods may additionally or alternatively be executed by any one system, or any combination of systems, including, but not limited to, those described herein.

FIG. 4 is a flow diagram showing a method 400 for switching between visualizations, in accordance with some embodiments of the present disclosure. The method 400, at block B402, includes generating two or more image frames based at least on sensor data, the sensor data corresponding to a first time slice and generated using on one or more sensors of an ego-machine in an environment. For example, with respect to FIG. 1, the environment visualization pipeline 100 may include any number and type of sensor(s) 101 such one or more cameras which may be used to generate sensor data (e.g., the image data 105) representing the surrounding environment.

The method 400, at block B404, includes switching, based at least on a state of the ego-machine, from generating a first visualization of the environment using a three-dimensional (3D) bowl model of the environment to generating a second visualization of the environment that uses a 3D surface topology model of the environment. For example, with respect to FIG. 1, the environmental modeling pipeline selection component 120 may select or switch between supported environmental modeling techniques (e.g., implemented by the 3D bowl modeling pipeline 115 and the detected 3D surface topology modeling pipeline 117). In some embodiments, the environmental modeling pipeline selection component 120 includes an environmental model-toggling state machine 150 that implements the decision-making logic for selecting and/or switching between the supported environmental modeling techniques. Switching and/or selection may be based on any number of detectible factors, such as a state of the ego-machine (e.g., proximity to a detected pedestrian; proximity to detected objects; one or more detected features indicative of a designated operational scenario, such as parking scenarios or off-road scenarios; speed of ego-motion; and/or others) as determined by the ego-machine state detection component 140; estimated image quality of a corresponding visualization (e.g., which may be based on confidence of corresponding depth estimates used to generate the visualization) as determined by the estimated image quality module 146; selections and/or preferences of the operator of the ego-machine looked up by the selection/preference module 147; and/or others.

The method 400, at block B406, includes presenting the second visualization of the environment based at least on the two or more image frames. For example, with respect to FIG. 1, the detected 3D surface topology modeling pipeline 117 may generate a visualization using an environmental modeling pipeline that models the surrounding environment as a detected 3D surface topology (e.g., in certain scenarios, such as lower speed of ego-motion, detected objects within a threshold distance, and/or others) via, and/or the 3D bowl modeling pipeline 115 may generate a visualization using an environmental modeling pipeline that models the surrounding environment as a 3D bowl (e.g., in other scenarios, such as higher speed of ego-motion, no detected objects within a threshold distance, and/or others).

The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing, generative AI, and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems implementing one or more language models-such as one or more large language models (LLMs), systems for performing light transport simulation, systems for performing collaborative content creation for 3D assets, systems implemented at least partially using cloud computing resources, and/or other types of systems.

Example Autonomous Vehicle

Figure 5A:
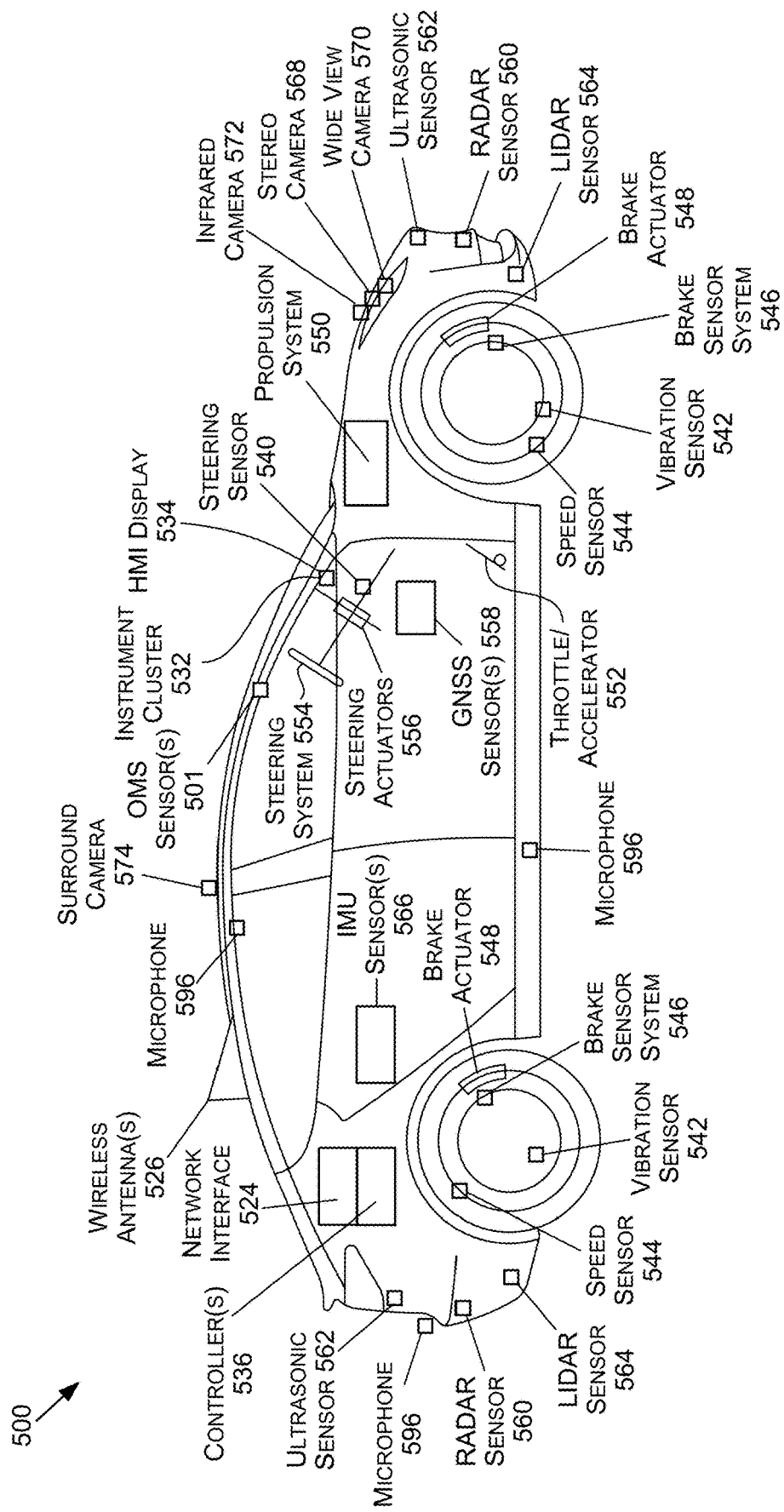
FIG. 5A is an illustration of an example autonomous vehicle, in accordance with some embodiments of the present disclosure.

FIG. 5A is an illustration of an example autonomous vehicle 500, in accordance with some embodiments of the present disclosure. The autonomous vehicle 500 (alternatively referred to herein as the "vehicle 500") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 500 may be capable of functionality in accordance with one or more of Level 3-Level 5 of the autonomous driving levels. The vehicle 500 may be capable of functionality in accordance with one or more of Level 1-Level 5 of the autonomous driving levels. For example, the vehicle 500 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 500 or other machine, such as being fully autonomous, being highly autonomous, being conditionally autonomous, being partially autonomous, providing assistive autonomy, being semi-autonomous, being primarily autonomous, or other designation.

The vehicle 500 may include components such as a chassis, a vehicle body, wheels (e.g., 2, 4, 6, 8, 18, etc.), tires, axles, and other components of a vehicle. The vehicle 500 may include a propulsion system 550, such as an internal combustion engine, hybrid electric power plant, an all-electric engine, and/or another propulsion system type. The propulsion system 550 may be connected to a drive train of the vehicle 500, which may include a transmission, to allow the propulsion of the vehicle 500. The propulsion system 550 may be controlled in response to receiving signals from the throttle/accelerator 552.

A steering system 554, which may include a steering wheel, may be used to steer the vehicle 500 (e.g., along a desired path or route) when the propulsion system 550 is operating (e.g., when the vehicle is in motion). The steering system 554 may receive signals from a steering actuator 556. The steering wheel may be optional for full automation (Level 5) functionality.

The brake sensor system 546 may be used to operate the vehicle brakes in response to receiving signals from the brake actuators 548 and/or brake sensors.

Controller(s) 536, which may include one or more system on chips (SoCs) 504 (FIG. 5C) and/or GPU(s), may provide signals (e.g., representative of commands) to one or more components and/or systems of the vehicle 500. For example, the controller(s) may send signals to operate the vehicle brakes via one or more brake actuators 548, to operate the steering system 554 via one or more steering actuators 556, to operate the propulsion system 550 via one or more throttle/accelerators 552. The controller(s) 536 may include one or more onboard (e.g., integrated) computing devices (e.g., supercomputers) that process sensor signals, and output operation commands (e.g., signals representing commands) to allow autonomous driving and/or to assist a human driver in driving the vehicle 500. The controller(s) 536 may include a first controller 536 for autonomous driving functions, a second controller 536 for functional safety functions, a third controller 536 for artificial intelligence functionality (e.g., computer vision), a fourth controller 536 for infotainment functionality, a fifth controller 536 for redundancy in emergency conditions, and/or other controllers. In some examples, a single controller 536 may handle two or more of the above functionalities, two or more controllers 536 may handle a single functionality, and/or any combination thereof.

The controller(s) 536 may provide the signals for controlling one or more components and/or systems of the vehicle 500 in response to sensor data received from one or more sensors (e.g., sensor inputs). The sensor data may be received from, for example and without limitation, global navigation satellite systems ("GNSS") sensor(s) 558 (e.g., Global Positioning System sensor(s)), RADAR sensor(s) 560, ultrasonic sensor(s) 562, LiDAR sensor(s) 564, inertial measurement unit (IMU) sensor(s) 566 (e.g., accelerometer(s), gyroscope(s), magnetic compass(es), magnetometer(s), etc.), microphone(s) 596, stereo camera(s) 568, wide-view camera(s) 570 (e.g., fisheye cameras), infrared camera(s) 572, surround camera(s) 574 (e.g., 360 degree cameras), long-range and/or mid-range camera(s) 598, speed sensor(s) 544 (e.g., for measuring the speed of the vehicle 500), vibration sensor(s) 542, steering sensor(s) 540, brake sensor(s) (e.g., as part of the brake sensor system 546), one or more occupant monitoring system (OMS) sensor(s) 501 (e.g., one or more interior cameras), and/or other sensor types.

One or more of the controller(s) 536 may receive inputs (e.g., represented by input data) from an instrument cluster 532 of the vehicle 500 and provide outputs (e.g., represented by output data, display data, etc.) via a human-machine interface (HMI) display 534, an audible annunciator, a loudspeaker, and/or via other components of the vehicle 500. The outputs may include information such as vehicle velocity, speed, time, map data (e.g., the High Definition ("HD") map 522 of FIG. 5C), location data (e.g., the vehicle's 500 location, such as on a map), direction, location of other vehicles (e.g., an occupancy grid), information about objects and status of objects as perceived by the controller(s) 536, etc. For example, the HMI display 534 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 500 further includes a network interface 524 which may use one or more wireless antenna(s) 526 and/or modem(s) to communicate over one or more networks. For example, the network interface 524 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 526 may also allow communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 5B:
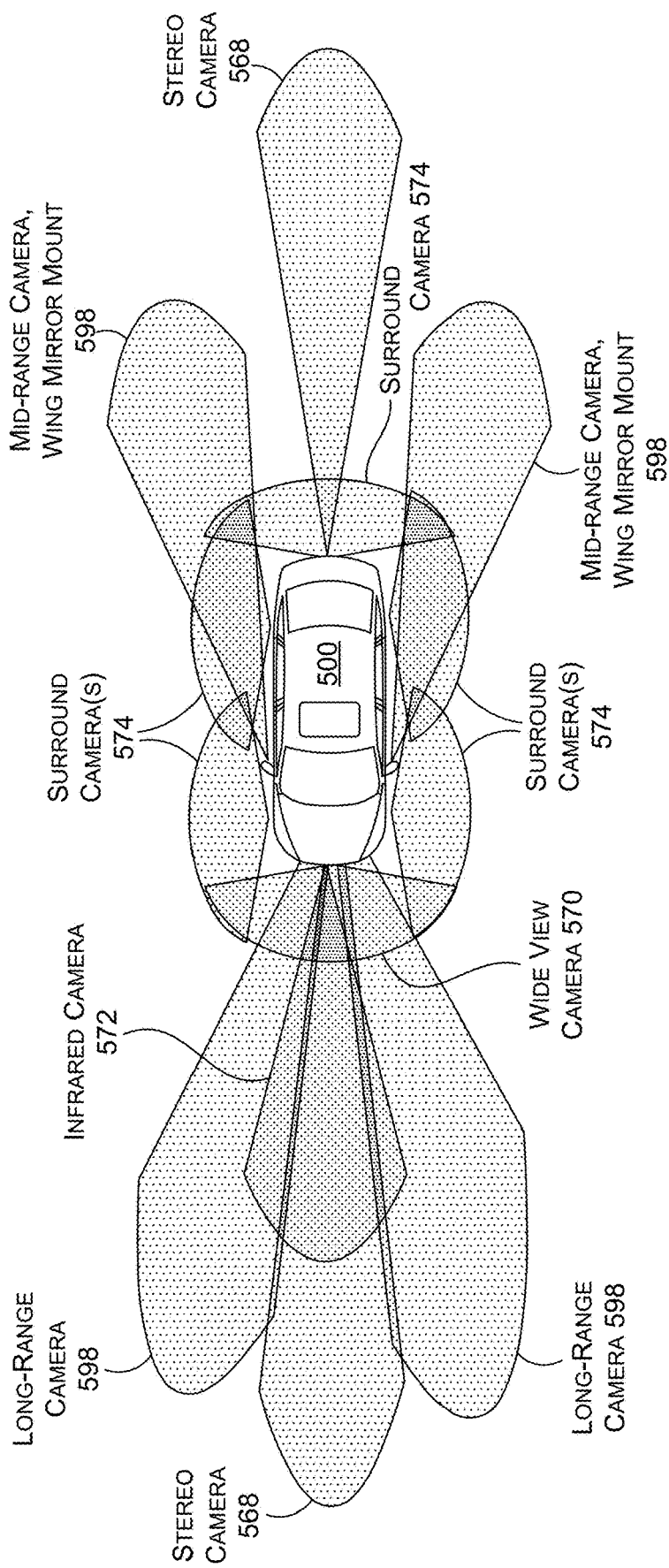
FIG. 5B is an example of camera locations and fields of view for the example autonomous vehicle of FIG. 5A, in accordance with some embodiments of the present disclosure.

FIG. 5B is an example of camera locations and fields of view for the example autonomous vehicle 500 of FIG. 5A, in accordance with some embodiments of the present disclosure. The cameras and respective fields of view are one example embodiment and are not intended to be limiting. For example, additional and/or alternative cameras may be included and/or the cameras may be located at different locations on the vehicle 500.

The camera types for the cameras may include, but are not limited to, digital cameras that may be adapted for use with the components and/or systems of the vehicle 500. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 500 (e.g., front-facing cameras) may be used for surround view, to help identify forward facing paths and obstacles, as well aid in, with the help of one or more controllers 536 and/or control SoCs, providing information critical to generating an occupancy grid and/or determining the preferred vehicle paths. Front-facing cameras may be used to perform many of the same ADAS functions as LiDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 570 that may be used to perceive objects coming into view from the periphery (e.g., pedestrians, crossing traffic or bicycles). Although only one wide-view camera is illustrated in FIG. 5B, there may be any number (including zero) of wide-view cameras 570 on the vehicle 500. In addition, any number of long-range camera(s) 598 (e.g., a long-view stereo camera pair) may be used for depth-based object detection, especially for objects for which a neural network has not yet been trained. The long-range camera(s) 598 may also be used for object detection and classification, as well as basic object tracking.

Any number of stereo cameras 568 may also be included in a front-facing configuration. In at least one embodiment, one or more of stereo camera(s) 568 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 568 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 568 may be used in addition to, or alternatively from, those described herein.

Cameras with a field of view that include portions of the environment to the side of the vehicle 500 (e.g., side-view cameras) may be used for surround view, providing information used to create and update the occupancy grid, as well as to generate side impact collision warnings. For example, surround camera(s) 574 (e.g., four surround cameras 574 as illustrated in FIG. 5B) may be positioned to on the vehicle 500. The surround camera(s) 574 may include wide-view camera(s) 570, fisheye camera(s), 360 degree camera(s), and/or the like. Four example, four fisheye cameras may be positioned on the vehicle's front, rear, and sides. In an alternative arrangement, the vehicle may use three surround camera(s) 574 (e.g., left, right, and rear), and may leverage one or more other camera(s) (e.g., a forward-facing camera) as a fourth surround view camera.

Cameras with a field of view that include portions of the environment to the rear of the vehicle 500 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 598, stereo camera(s) 568), infrared camera(s) 572, etc.), as described herein.

Cameras with a field of view that include portions of the interior environment within the cabin of the vehicle 500 (e.g., one or more OMS sensor(s) 501) may be used as part of an occupant monitoring system (OMS) such as, but not limited to, a driver monitoring system (DMS). For example, OMS sensors (e.g., the OMS sensor(s) 501) may be used (e.g., by the controller(s) 536) to track an occupant's and/or driver's gaze direction, head pose, and/or blinking. This gaze information may be used to determine a level of attentiveness of the occupant or driver (e.g., to detect drowsiness, fatigue, and/or distraction), and/or to take responsive action to prevent harm to the occupant or operator. In some embodiments, data from OMS sensors may be used to allow gaze-controlled operations triggered by driver and/or non-driver occupants such as, but not limited to, adjusting cabin temperature and/or airflow, opening and closing windows, controlling cabin lighting, controlling entertainment systems, adjusting mirrors, adjusting seat positions, and/or other operations. In some embodiments, an OMS may be used for applications such as determining when objects and/or occupants have been left behind in a vehicle cabin (e.g., by detecting occupant presence after the driver exits the vehicle).

Figure 5C:
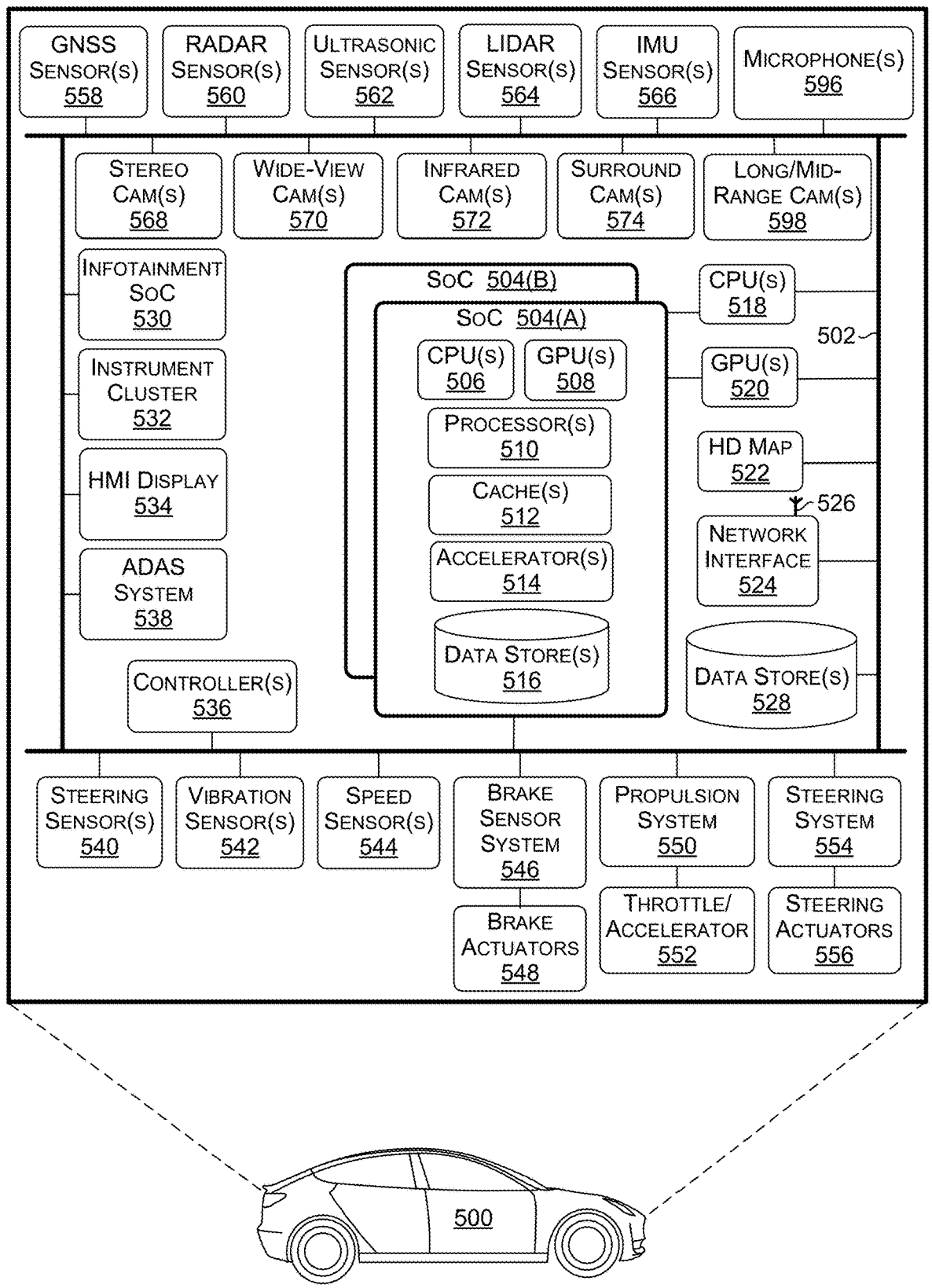
FIG. 5C is a block diagram of an example system architecture for the example autonomous vehicle of FIG. 5A, in accordance with some embodiments of the present disclosure.

FIG. 5C is a block diagram of an example system architecture for the example autonomous vehicle 500 of FIG. 5A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 500 in FIG. 5C are illustrated as being connected via bus 502. The bus 502 may include a Controller Area Network (CAN) data interface (alternatively referred to herein as a "CAN bus"). A CAN may be a network inside the vehicle 500 used to aid in control of various features and functionality of the vehicle 500, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 502 is described herein as being a CAN bus, this is not intended to be limiting. For example, in addition to, or alternatively from, the CAN bus, FlexRay and/or Ethernet may be used. Additionally, although a single line is used to represent the bus 502, this is not intended to be limiting. For example, there may be any number of busses 502, which may include one or more CAN busses, one or more FlexRay busses, one or more Ethernet busses, and/or one or more other types of busses using a different protocol. In some examples, two or more busses 502 may be used to perform different functions, and/or may be used for redundancy. For example, a first bus 502 may be used for collision avoidance functionality and a second bus 502 may be used for actuation control. In any example, each bus 502 may communicate with any of the components of the vehicle 500, and two or more busses 502 may communicate with the same components. In some examples, each SoC 504, each controller 536, and/or each computer within the vehicle may have access to the same input data (e.g., inputs from sensors of the vehicle 500), and may be connected to a common bus, such the CAN bus.

The vehicle 500 may include one or more controller(s) 536, such as those described herein with respect to FIG. 5A. The controller(s) 536 may be used for a variety of functions. The controller(s) 536 may be coupled to any of the various other components and systems of the vehicle 500, and may be used for control of the vehicle 500, artificial intelligence of the vehicle 500, infotainment for the vehicle 500, and/or the like.

The vehicle 500 may include a system(s) on a chip (SoC) 504. The SoC 504 may include CPU(s) 506, GPU(s) 508, processor(s) 510, cache(s) 512, accelerator(s) 514, data store(s) 516, and/or other components and features not illustrated. The SoC(s) 504 may be used to control the vehicle 500 in a variety of platforms and systems. For example, the SoC(s) 504 may be combined in a system (e.g., the system of the vehicle 500) with an HD map 522 which may obtain map refreshes and/or updates via a network interface 524 from one or more servers (e.g., server(s) 578 of FIG. 5D).

The CPU(s) 506 may include a CPU cluster or CPU complex (alternatively referred to herein as a "CCPLEX"). The CPU(s) 506 may include multiple cores and/or L2 caches. For example, in some embodiments, the CPU(s) 506 may include eight cores in a coherent multi-processor configuration. In some embodiments, the CPU(s) 506 may include four dual-core clusters where each cluster has a dedicated L2 cache (e.g., a 2 MB L2 cache). The CPU(s) 506 (e.g., the CCPLEX) may be configured to support simultaneous cluster operation allowing any combination of the clusters of the CPU(s) 506 to be active at any given time.

The CPU(s) 506 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 506 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 508 may include an integrated GPU (alternatively referred to herein as an "iGPU"). The GPU(s) 508 may be programmable and may be efficient for parallel workloads. The GPU(s) 508, in some examples, may use an enhanced tensor instruction set. The GPU(s) 508 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 508 may include at least eight streaming microprocessors. The GPU(s) 508 may use compute application programming interface(s) (API(s)). In addition, the GPU(s) 508 may use one or more parallel computing platforms and/or programming models (e.g., NVIDIA's CUDA).

The GPU(s) 508 may be power-optimized for best performance in automotive and embedded use cases. For example, the GPU(s) 508 may be fabricated on a Fin field-effect transistor (FinFET). However, this is not intended to be limiting and the GPU(s) 508 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to allow finer-grain synchronization and cooperation between parallel threads. The streaming microprocessors may include a combined L1 data cache and shared memory unit in order to improve performance while simplifying programming.

The GPU(s) 508 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 508 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 508 to access the CPU(s) 506 page tables directly. In such examples, when the GPU(s) 508 memory management unit (MMU) experiences a miss, an address translation request may be transmitted to the CPU(s) 506. In response, the CPU(s) 506 may look in its page tables for the virtual-to-physical mapping for the address and transmits the translation back to the GPU(s) 508. As such, unified memory technology may allow a single unified virtual address space for memory of both the CPU(s) 506 and the GPU(s) 508, thereby simplifying the GPU(s) 508 programming and porting of applications to the GPU(s) 508.

In addition, the GPU(s) 508 may include an access counter that may keep track of the frequency of access of the GPU(s) 508 to memory of other processors. The access counter may help ensure that memory pages are moved to the physical memory of the processor that is accessing the pages most frequently.

The SoC(s) 504 may include any number of cache(s) 512, including those described herein. For example, the cache(s) 512 may include an L3 cache that is available to both the CPU(s) 506 and the GPU(s) 508 (e.g., that is connected both the CPU(s) 506 and the GPU(s) 508). The cache(s) 512 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 504 may include an arithmetic logic unit(s) (ALU(s)) which may be leveraged in performing processing with respect to any of the variety of tasks or operations of the vehicle 500—such as processing DNNs. In addition, the SoC(s) 504 may include a floating point unit(s) (FPU(s))—or other math coprocessor or numeric coprocessor types—for performing mathematical operations within the system. For example, the SoC(s) 504 may include one or more FPUs integrated as execution units within a CPU(s) 506 and/or GPU(s) 508.

The SoC(s) 504 may include one or more accelerators 514 (e.g., hardware accelerators, software accelerators, or a combination thereof). For example, the SoC(s) 504 may include a hardware acceleration cluster that may include optimized hardware accelerators and/or large on-chip memory. The large on-chip memory (e.g., 4 MB of SRAM), may allow the hardware acceleration cluster to accelerate neural networks and other calculations. The hardware acceleration cluster may be used to complement the GPU(s) 508 and to off-load some of the tasks of the GPU(s) 508 (e.g., to free up more cycles of the GPU(s) 508 for performing other tasks). As an example, the accelerator(s) 514 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 514 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 508, and by using an inference accelerator, for example, a designer may target either the DLA(s) or the GPU(s) 508 for any function. For example, the designer may focus processing of CNNs and floating point operations on the DLA(s) and leave other functions to the GPU(s) 508 and/or other accelerator(s) 514.

The accelerator(s) 514 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may allow components of the PVA(s) to access the system memory independently of the CPU(s) 506. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 514 (e.g., the hardware acceleration cluster) may include a computer vision network on-chip and SRAM, for providing a high-bandwidth, low latency SRAM for the accelerator(s) 514. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 504 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LiDAR data for purposes of localization and/or other functions, and/or for other uses. In some embodiments, one or more tree traversal units (TTUs) may be used for executing one or more ray-tracing related operations.

The accelerator(s) 514 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. As such, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 566 output that correlates with the vehicle 500 orientation, distance, 3D location estimates of the object obtained from the neural network and/or other sensors (e.g., LiDAR sensor(s) 564 or RADAR sensor(s) 560), among others.

The SoC(s) 504 may include data store(s) 516 (e.g., memory). The data store(s) 516 may be on-chip memory of the SoC(s) 504, which may store neural networks to be executed on the GPU and/or the DLA. In some examples, the data store(s) 516 may be large enough in capacity to store multiple instances of neural networks for redundancy and safety. The data store(s) 516 may comprise L2 or L3 cache(s) 512. Reference to the data store(s) 516 may include reference to the memory associated with the PVA, DLA, and/or other accelerator(s) 514, as described herein.

The SoC(s) 504 may include one or more processor(s) 510 (e.g., embedded processors). The processor(s) 510 may include a boot and power management processor that may be a dedicated processor and subsystem to handle boot power and management functions and related security enforcement. The boot and power management processor may be a part of the SoC(s) 504 boot sequence and may provide runtime power management services. The boot power and management processor may provide clock and voltage programming, assistance in system low power state transitions, management of SoC(s) 504 thermals and temperature sensors, and/or management of the SoC(s) 504 power states. Each temperature sensor may be implemented as a ring-oscillator whose output frequency is proportional to temperature, and the SoC(s) 504 may use the ring-oscillators to detect temperatures of the CPU(s) 506, GPU(s) 508, and/or accelerator(s) 514. If temperatures are determined to exceed a threshold, the boot and power management processor may enter a temperature fault routine and put the SoC(s) 504 into a lower power state and/or put the vehicle 500 into a chauffeur to safe stop mode (e.g., bring the vehicle 500 to a safe stop).

The processor(s) 510 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 510 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 510 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 510 may further include a real-time camera engine that may include a dedicated processor subsystem for handling real-time camera management.

The processor(s) 510 may further include a high-dynamic range signal processor that may include an image signal processor that is a hardware engine that is part of the camera processing pipeline.

The processor(s) 510 may include a video image compositor that may be a processing block (e.g., implemented on a microprocessor) that implements video post-processing functions needed by a video playback application to produce the final image for the player window. The video image compositor may perform lens distortion correction on wide-view camera(s) 570, surround camera(s) 574, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 508 is not required to continuously render new surfaces. Even when the GPU(s) 508 is powered on and active doing 3D rendering, the video image compositor may be used to offload the GPU(s) 508 to improve performance and responsiveness.

The SoC(s) 504 may further include a mobile industry processor interface (MIPI) camera serial interface for receiving video and input from cameras, a high-speed interface, and/or a video input block that may be used for camera and related pixel input functions. The SoC(s) 504 may further include an input/output controller(s) that may be controlled by software and may be used for receiving I/O signals that are uncommitted to a specific role.

The SoC(s) 504 may further include a broad range of peripheral interfaces to allow communication with peripherals, audio codecs, power management, and/or other devices. The SoC(s) 504 may be used to process data from cameras (e.g., connected over Gigabit Multimedia Serial Link and Ethernet), sensors (e.g., LiDAR sensor(s) 564, RADAR sensor(s) 560, etc. that may be connected over Ethernet), data from bus 502 (e.g., speed of vehicle 500, steering wheel position, etc.), data from GNSS sensor(s) 558 (e.g., connected over Ethernet or CAN bus). The SoC(s) 504 may further include dedicated high-performance mass storage controllers that may include their own DMA engines, and that may be used to free the CPU(s) 506 from routine data management tasks.

The SoC(s) 504 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 504 may be faster, more reliable, and even more energy-efficient and space-efficient than conventional systems. For example, the accelerator(s) 514, when combined with the CPU(s) 506, the GPU(s) 508, and the data store(s) 516, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to allow Level 3-5 autonomous driving functionality. For example, a CNN executing on the DLA or dGPU (e.g., the GPU(s) 520) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 508.

In some examples, a CNN for facial recognition and vehicle owner identification may use data from camera sensors to identify the presence of an authorized driver and/or owner of the vehicle 500. The always on sensor processing engine may be used to unlock the vehicle when the owner approaches the driver door and turn on the lights, and, in security mode, to disable the vehicle when the owner leaves the vehicle. In this way, the SoC(s) 504 provide for security against theft and/or carjacking.

In another example, a CNN for emergency vehicle detection and identification may use data from microphones 596 to detect and identify emergency vehicle sirens. In contrast to conventional systems, that use general classifiers to detect sirens and manually extract features, the SoC(s) 504 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 558. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 562, until the emergency vehicle(s) passes.

The vehicle may include a CPU(s) 518 (e.g., discrete CPU(s), or dCPU(s)), that may be coupled to the SoC(s) 504 via a high-speed interconnect (e.g., PCIe). The CPU(s) 518 may include an X86 processor, for example. The CPU(s) 518 may be used to perform any of a variety of functions, including arbitrating potentially inconsistent results between ADAS sensors and the SoC(s) 504, and/or monitoring the status and health of the controller(s) 536 and/or infotainment SoC 530, for example.

The vehicle 500 may include a GPU(s) 520 (e.g., discrete GPU(s), or dGPU(s)), that may be coupled to the SoC(s) 504 via a high-speed interconnect (e.g., NVIDIA's NVLINK). The GPU(s) 520 may provide additional artificial intelligence functionality, such as by executing redundant and/or different neural networks, and may be used to train and/or update neural networks based on input (e.g., sensor data) from sensors of the vehicle 500.

The vehicle 500 may further include the network interface 524 which may include one or more wireless antennas 526 (e.g., one or more wireless antennas for different communication protocols, such as a cellular antenna, a Bluetooth antenna, etc.). The network interface 524 may be used to allow wireless connectivity over the Internet with the cloud (e.g., with the server(s) 578 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 500 information about vehicles in proximity to the vehicle 500 (e.g., vehicles in front of, on the side of, and/or behind the vehicle 500). This functionality may be part of a cooperative adaptive cruise control functionality of the vehicle 500.

The network interface 524 may include a SoC that provides modulation and demodulation functionality and enables the controller(s) 536 to communicate over wireless networks. The network interface 524 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 500 may further include data store(s) 528 which may include off-chip (e.g., off the SoC(s) 504) storage. The data store(s) 528 may include one or more storage elements including RAM, SRAM, DRAM, VRAM, Flash, hard disks, and/or other components and/or devices that may store at least one bit of data.

The vehicle 500 may further include GNSS sensor(s) 558. The GNSS sensor(s) 558 (e.g., GPS, assisted GPS sensors, differential GPS (DGPS) sensors, etc.), to assist in mapping, perception, occupancy grid generation, and/or path planning functions. Any number of GNSS sensor(s) 558 may be used, including, for example and without limitation, a GPS using a USB connector with an Ethernet to Serial (RS-232) bridge.

The vehicle 500 may further include RADAR sensor(s) 560. The RADAR sensor(s) 560 may be used by the vehicle 500 for long-range vehicle detection, even in darkness and/or severe weather conditions. RADAR functional safety levels may be ASIL B. The RADAR sensor(s) 560 may use the CAN and/or the bus 502 (e.g., to transmit data generated using the RADAR sensor(s) 560) for control and to access object tracking data, with access to Ethernet to access raw data in some examples. A wide variety of RADAR sensor types may be used. For example, and without limitation, the RADAR sensor(s) 560 may be suitable for front, rear, and side RADAR use. In some example, Pulse Doppler RADAR sensor(s) are used.

The RADAR sensor(s) 560 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 560 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 500 surroundings at higher speeds with minimal interference from traffic in adjacent lanes. The other two antennae may expand the field of view, making it possible to quickly detect vehicles entering or leaving the vehicle's 500 lane.

Mid-range RADAR systems may include, as an example, a range of up to 560 m (front) or 80 m (rear), and a field of view of up to 42 degrees (front) or 550 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 500 may further include ultrasonic sensor(s) 562. The ultrasonic sensor(s) 562, which may be positioned at the front, back, and/or the sides of the vehicle 500, may be used for park assist and/or to create and update an occupancy grid. A wide variety of ultrasonic sensor(s) 562 may be used, and different ultrasonic sensor(s) 562 may be used for different ranges of detection (e.g., 2.5 m, 4 m). The ultrasonic sensor(s) 562 may operate at functional safety levels of ASIL B.

The vehicle 500 may include LiDAR sensor(s) 564. The LiDAR sensor(s) 564 may be used for object and pedestrian detection, emergency braking, collision avoidance, and/or other functions. The LiDAR sensor(s) 564 may be functional safety level ASIL B. In some examples, the vehicle 500 may include multiple LiDAR sensors 564 (e.g., two, four, six, etc.) that may use Ethernet (e.g., to provide data to a Gigabit Ethernet switch).

In some examples, the LiDAR sensor(s) 564 may be capable of providing a list of objects and their distances for a 360-degree field of view. Commercially available LiDAR sensor(s) 564 may have an advertised range of approximately 500 m, with an accuracy of 2 cm-3 cm, and with support for a 500 Mbps Ethernet connection, for example. In some examples, one or more non-protruding LiDAR sensors 564 may be used. In such examples, the LiDAR sensor(s) 564 may be implemented as a small device that may be embedded into the front, rear, sides, and/or corners of the vehicle 500. The LiDAR sensor(s) 564, in such examples, may provide up to a 120-degree horizontal and 35-degree vertical field-of-view, with a 200 m range even for low-reflectivity objects. Front-mounted LiDAR sensor(s) 564 may be configured for a horizontal field of view between 45 degrees and 135 degrees.

In some examples, LiDAR technologies, such as 3D flash LiDAR, may also be used. 3D Flash LiDAR uses a flash of a laser as a transmission source, to illuminate vehicle surroundings up to approximately 200 m. A flash LiDAR unit includes a receptor, which records the laser pulse transit time and the reflected light on each pixel, which in turn corresponds to the range from the vehicle to the objects. Flash LiDAR may allow for highly accurate and distortion-free images of the surroundings to be generated with every laser flash. In some examples, four flash LiDAR sensors may be deployed, one at each side of the vehicle 500. Available 3D flash LiDAR systems include a solid-state 3D staring array LiDAR camera with no moving parts other than a fan (e.g., a non-scanning LiDAR device). The flash LiDAR device may use a 5 nanosecond class I (eye-safe) laser pulse per frame and may capture the reflected laser light in the form of 3D range point clouds and co-registered intensity data. By using flash LiDAR, and because flash LiDAR is a solid-state device with no moving parts, the LiDAR sensor(s) 564 may be less susceptible to motion blur, vibration, and/or shock.

The vehicle may further include IMU sensor(s) 566. The IMU sensor(s) 566 may be located at a center of the rear axle of the vehicle 500, in some examples. The IMU sensor(s) 566 may include, for example and without limitation, an accelerometer(s), a magnetometer(s), a gyroscope(s), a magnetic compass(es), and/or other sensor types. In some examples, such as in six-axis applications, the IMU sensor(s) 566 may include accelerometers and gyroscopes, while in nine-axis applications, the IMU sensor(s) 566 may include accelerometers, gyroscopes, and magnetometers.

In some embodiments, the IMU sensor(s) 566 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 566 may allow the vehicle 500 to estimate heading without requiring input from a magnetic sensor by directly observing and correlating the changes in velocity from GPS to the IMU sensor(s) 566. In some examples, the IMU sensor(s) 566 and the GNSS sensor(s) 558 may be combined in a single integrated unit.

The vehicle may include microphone(s) 596 placed in and/or around the vehicle 500. The microphone(s) 596 may be used for emergency vehicle detection and identification, among other things.

The vehicle may further include any number of camera types, including stereo camera(s) 568, wide-view camera(s) 570, infrared camera(s) 572, surround camera(s) 574, long-range and/or mid-range camera(s) 598, and/or other camera types. The cameras may be used to capture image data around an entire periphery of the vehicle 500. The types of cameras used depends on the embodiments and requirements for the vehicle 500, and any combination of camera types may be used to provide the necessary coverage around the vehicle 500. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 5A and FIG. 5B.

The vehicle 500 may further include vibration sensor(s) 542. The vibration sensor(s) 542 may measure vibrations of components of the vehicle, such as the axle(s). For example, changes in vibrations may indicate a change in road surfaces. In another example, when two or more vibration sensors 542 are used, the differences between the vibrations may be used to determine friction or slippage of the road surface (e.g., when the difference in vibration is between a power-driven axle and a freely rotating axle).

The vehicle 500 may include an ADAS system 538. The ADAS system 538 may include a SoC, in some examples. The ADAS system 538 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 560, LiDAR sensor(s) 564, and/or a camera(s). The ACC systems may include longitudinal ACC and/or lateral ACC. Longitudinal ACC monitors and controls the distance to the vehicle immediately ahead of the vehicle 500 and automatically adjust the vehicle speed to maintain a safe distance from vehicles ahead. Lateral ACC performs distance keeping, and advises the vehicle 500 to change lanes when necessary. Lateral ACC is related to other ADAS applications such as LCA and CWS.

CACC uses information from other vehicles that may be received via the network interface 524 and/or the wireless antenna(s) 526 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 500), while the I2V communication concept provides information about traffic further ahead. CACC systems may include either or both I2V and V2V information sources. Given the information of the vehicles ahead of the vehicle 500, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 560, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 560, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 500 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 500 if the vehicle 500 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 560, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 500 is backing up. Some RCTW systems include AEB to ensure that the vehicle brakes are applied to avoid a crash. RCTW systems may use one or more rear-facing RADAR sensor(s) 560, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 500, the vehicle 500 itself must, in the case of conflicting results, decide whether to heed the result from a primary computer or a secondary computer (e.g., a first controller 536 or a second controller 536). For example, in some embodiments, the ADAS system 538 may be a backup and/or secondary computer for providing perception information to a backup computer rationality module. The backup computer rationality monitor may run a redundant diverse software on hardware components to detect faults in perception and dynamic driving tasks. Outputs from the ADAS system 538 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 504.

In other examples, ADAS system 538 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 538 may be fed into the primary computer's perception block and/or the primary computer's dynamic driving task block. For example, if the ADAS system 538 indicates a forward crash warning due to an object immediately ahead, the perception block may use this information when identifying objects. In other examples, the secondary computer may have its own neural network which is trained and thus reduces the risk of false positives, as described herein.

The vehicle 500 may further include the infotainment SoC 530 (e.g., an in-vehicle infotainment system (IVI)). Although illustrated and described as a SoC, the infotainment system may not be a SoC, and may include two or more discrete components. The infotainment SoC 530 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 500. For example, the infotainment SoC 530 may radios, disk players, navigation systems, video players, USB and Bluetooth connectivity, carputers, in-car entertainment, Wi-Fi, steering wheel audio controls, hands free voice control, a heads-up display (HUD), an HMI display 534, a telematics device, a control panel (e.g., for controlling and/or interacting with various components, features, and/or systems), and/or other components. The infotainment SoC 530 may further be used to provide information (e.g., visual and/or audible) to a user(s) of the vehicle, such as information from the ADAS system 538, autonomous driving information such as planned vehicle maneuvers, trajectories, surrounding environment information (e.g., intersection information, vehicle information, road information, etc.), and/or other information.

The infotainment SoC 530 may include GPU functionality. The infotainment SoC 530 may communicate over the bus 502 (e.g., CAN bus, Ethernet, etc.) with other devices, systems, and/or components of the vehicle 500. In some examples, the infotainment SoC 530 may be coupled to a supervisory MCU such that the GPU of the infotainment system may perform some self-driving functions in the event that the primary controller(s) 536 (e.g., the primary and/or backup computers of the vehicle 500) fail. In such an example, the infotainment SoC 530 may put the vehicle 500 into a chauffeur to safe stop mode, as described herein.

The vehicle 500 may further include an instrument cluster 532 (e.g., a digital dash, an electronic instrument cluster, a digital instrument panel, etc.). The instrument cluster 532 may include a controller and/or supercomputer (e.g., a discrete controller or supercomputer). The instrument cluster 532 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 530 and the instrument cluster 532. As such, the instrument cluster 532 may be included as part of the infotainment SoC 530, or vice versa.

Figure 5D:
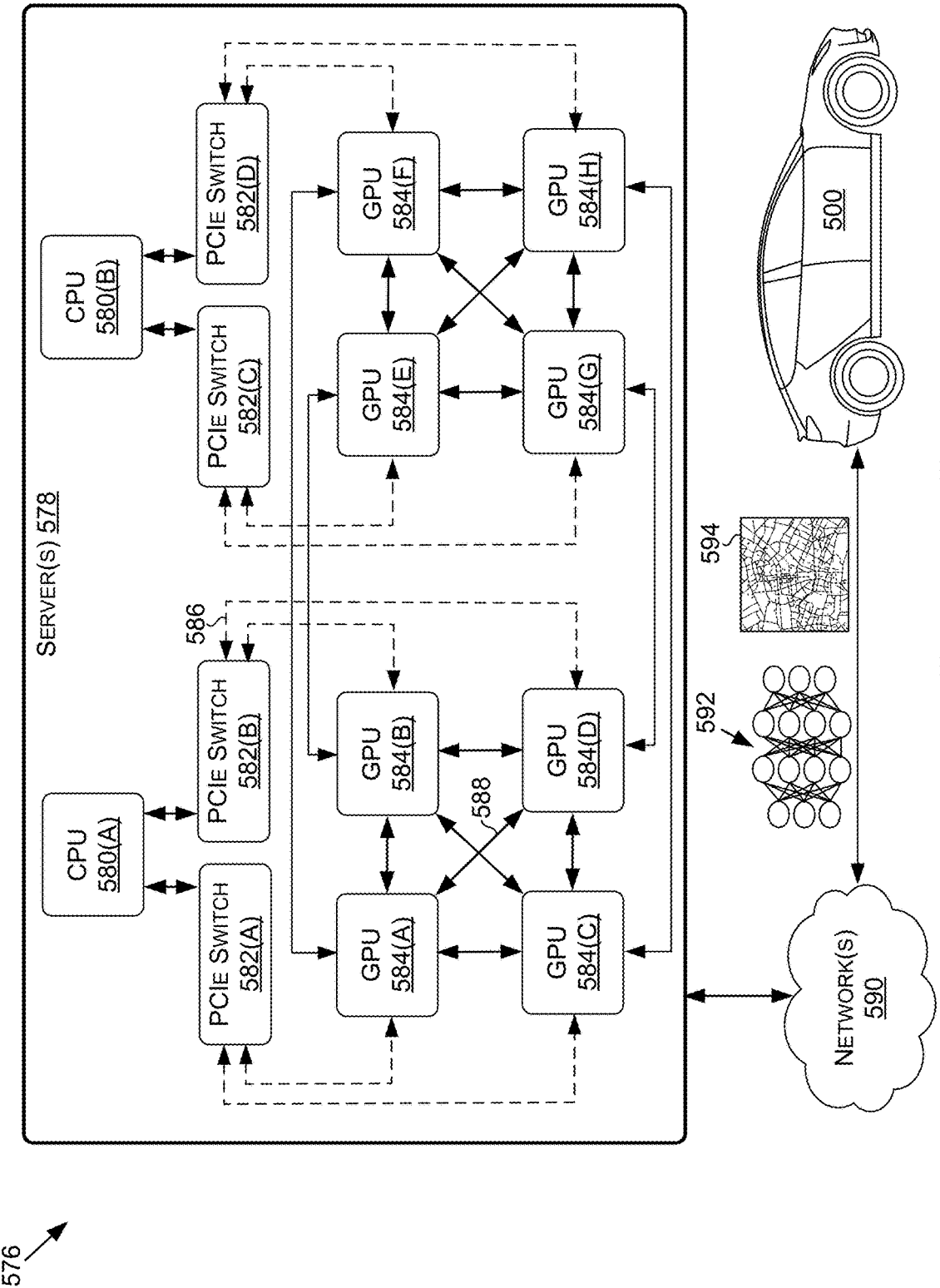
FIG. 5D is a system diagram for communication between cloud-based server(s) and the example autonomous vehicle of FIG. 5A, in accordance with some embodiments of the present disclosure.

FIG. 5D is a system diagram for communication between cloud-based server(s) and the example autonomous vehicle 500 of FIG. 5A, in accordance with some embodiments of the present disclosure. The system 576 may include server(s) 578, network(s) 590, and vehicles, including the vehicle 500. The server(s) 578 may include a plurality of GPUs 584(A)-584(H) (collectively referred to herein as GPUs 584), PCIe switches 582(A)-582(D) (collectively referred to herein as PCIe switches 582), and/or CPUs 580(A)-580(B) (collectively referred to herein as CPUs 580). The GPUs 584, the CPUs 580, and the PCIe switches may be interconnected with high-speed interconnects such as, for example and without limitation, NVLink interfaces 588 developed by NVIDIA and/or PCIe connections 586. In some examples, the GPUs 584 are connected via NVLink and/or NVSwitch SoC and the GPUs 584 and the PCIe switches 582 are connected via PCIe interconnects. Although eight GPUs 584, two CPUs 580, and two PCIe switches are illustrated, this is not intended to be limiting. Depending on the embodiment, each of the server(s) 578 may include any number of GPUs 584, CPUs 580, and/or PCIe switches. For example, the server(s) 578 may each include eight, sixteen, thirty-two, and/or more GPUs 584.

The server(s) 578 may receive, over the network(s) 590 and from the vehicles, image data representative of images showing unexpected or changed road conditions, such as recently commenced road-work. The server(s) 578 may transmit, over the network(s) 590 and to the vehicles, neural networks 592, updated neural networks 592, and/or map information 594, including information regarding traffic and road conditions. The updates to the map information 594 may include updates for the HD map 522, such as information regarding construction sites, potholes, detours, flooding, and/or other obstructions. In some examples, the neural networks 592, the updated neural networks 592, and/or the map information 594 may have resulted from new training and/or experiences represented in data received from any number of vehicles in the environment, and/or based on training performed at a datacenter (e.g., using the server(s) 578 and/or other servers).

The server(s) 578 may be used to train machine learning models (e.g., neural networks) based on training data. The training data may be generated using the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 590, and/or the machine learning models may be used by the server(s) 578 to remotely monitor the vehicles.

In some examples, the server(s) 578 may receive data from the vehicles and apply the data to up-to-date real-time neural networks for real-time intelligent inferencing. The server(s) 578 may include deep-learning supercomputers and/or dedicated AI computers powered by GPU(s) 584, such as a DGX and DGX Station machines developed by NVIDIA. However, in some examples, the server(s) 578 may include deep learning infrastructure that use only CPU-powered datacenters.

The deep-learning infrastructure of the server(s) 578 may be capable of fast, real-time inferencing, and may use that capability to evaluate and verify the health of the processors, software, and/or associated hardware in the vehicle 500. For example, the deep-learning infrastructure may receive periodic updates from the vehicle 500, such as a sequence of images and/or objects that the vehicle 500 has located in that sequence of images (e.g., via computer vision and/or other machine learning object classification techniques). The deep-learning infrastructure may run its own neural network to identify the objects and compare them with the objects identified by the vehicle 500 and, if the results do not match and the infrastructure concludes that the AI in the vehicle 500 is malfunctioning, the server(s) 578 may transmit a signal to the vehicle 500 instructing a fail-safe computer of the vehicle 500 to assume control, notify the passengers, and complete a safe parking maneuver.

For inferencing, the server(s) 578 may include the GPU(s) 584 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 6:
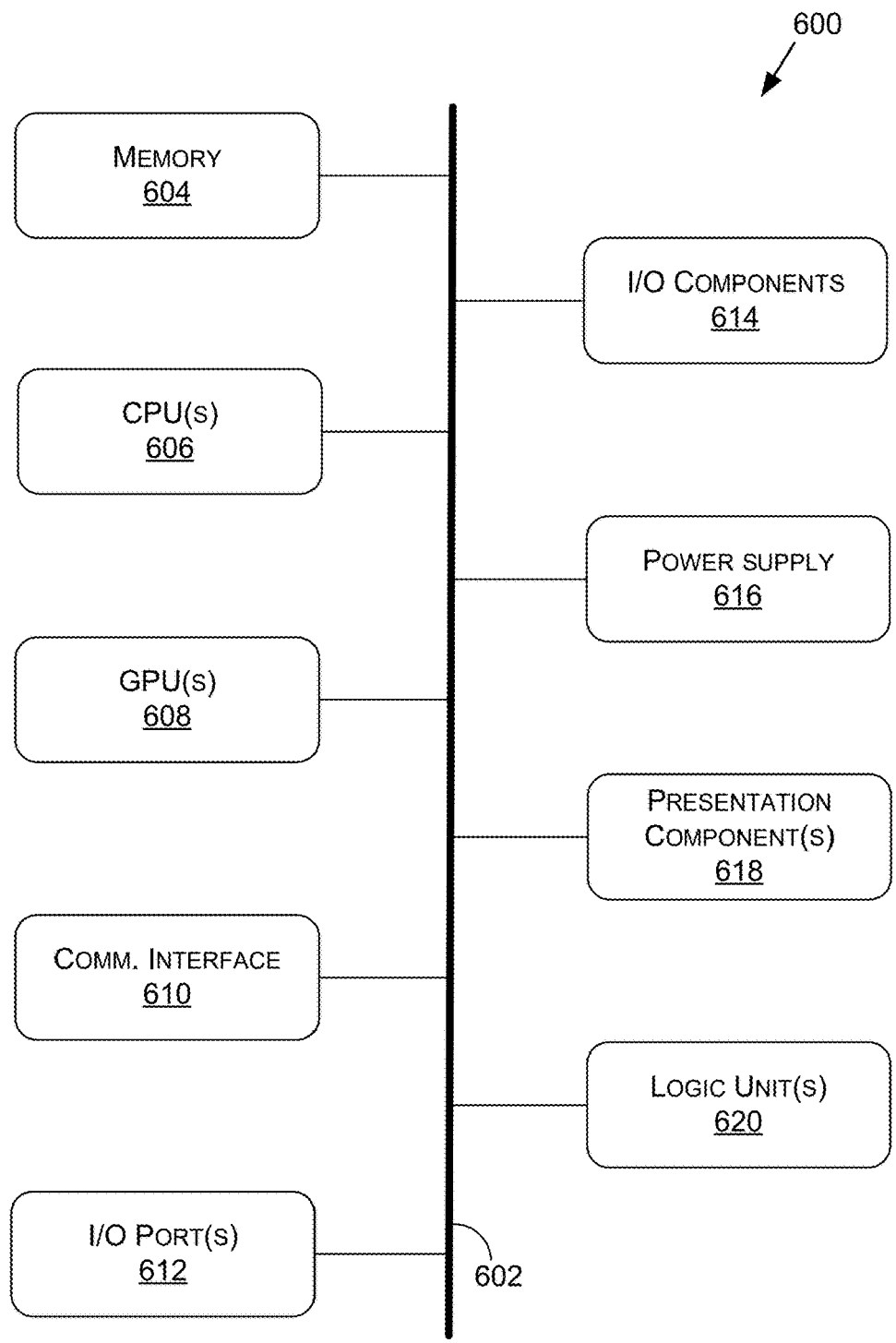
FIG. 6 is a block diagram of an example computing device suitable for use in implementing some embodiments of the present disclosure.

FIG. 6 is a block diagram of an example computing device(s) 600 suitable for use in implementing some embodiments of the present disclosure. Computing device 600 may include an interconnect system 602 that directly or indirectly couples the following devices: memory 604, one or more central processing units (CPUs) 606, one or more graphics processing units (GPUs) 608, a communication interface 610, input/output (I/O) ports 612, input/output components 614, a power supply 616, one or more presentation components 618 (e.g., display(s)), and one or more logic units 620. In at least one embodiment, the computing device(s) 600 may comprise one or more virtual machines (VMs), and/or any of the components thereof may comprise virtual components (e.g., virtual hardware components). For non-limiting examples, one or more of the GPUs 608 may comprise one or more vGPUs, one or more of the CPUs 606 may comprise one or more vCPUs, and/or one or more of the logic units 620 may comprise one or more virtual logic units. As such, a computing device(s) 600 may include discrete components (e.g., a full GPU dedicated to the computing device 600), virtual components (e.g., a portion of a GPU dedicated to the computing device 600), or a combination thereof.

Although the various blocks of FIG. 6 are shown as connected via the interconnect system 602 with lines, this is not intended to be limiting and is for clarity only. For example, in some embodiments, a presentation component 618, such as a display device, may be considered an I/O component 614 (e.g., if the display is a touch screen). As another example, the CPUs 606 and/or GPUs 608 may include memory (e.g., the memory 604 may be representative of a storage device in addition to the memory of the GPUs 608, the CPUs 606, and/or other components). As such, the computing device of FIG. 6 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 6.

The interconnect system 602 may represent one or more links or busses, such as an address bus, a data bus, a control bus, or a combination thereof. The interconnect system 602 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 606 may be directly connected to the memory 604. Further, the CPU 606 may be directly connected to the GPU 608. Where there is direct, or point-to-point connection between components, the interconnect system 602 may include a PCIe link to carry out the connection. In these examples, a PCI bus need not be included in the computing device 600.

The memory 604 may include any of a variety of computer-readable media. The computer-readable media may be any available media that may be accessed by the computing device 600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 600. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 606 may be configured to execute at least some of the computer-readable instructions to control one or more components of the computing device 600 to perform one or more of the methods and/or processes described herein. The CPU(s) 606 may each include one or more cores (e.g., one, two, four, eight, twenty-eight, seventy-two, etc.) that are capable of handling a multitude of software threads simultaneously. The CPU(s) 606 may include any type of processor, and may include different types of processors depending on the type of computing device 600 implemented (e.g., processors with fewer cores for mobile devices and processors with more cores for servers). For example, depending on the type of computing device 600, the processor may be an Advanced RISC Machines (ARM) processor implemented using Reduced Instruction Set Computing (RISC) or an x86 processor implemented using Complex Instruction Set Computing (CISC). The computing device

600 may include one or more CPUs 606 in addition to one or more microprocessors or supplementary co-processors, such as math co-processors.

In addition to or alternatively from the CPU(s) 606, the GPU(s) 608 may be configured to execute at least some of the computer-readable instructions to control one or more components of the computing device 600 to perform one or more of the methods and/or processes described herein. One or more of the GPU(s) 608 may be an integrated GPU (e.g., with one or more of the CPU(s) 606 and/or one or more of the GPU(s) 608 may be a discrete GPU. In embodiments, one or more of the GPU(s) 608 may be a coprocessor of one or more of the CPU(s) 606. The GPU(s) 608 may be used by the computing device 600 to render graphics (e.g., 3D graphics) or perform general purpose computations. For example, the GPU(s) 608 may be used for General-Purpose computing on GPUs (GPGPU). The GPU(s) 608 may include hundreds or thousands of cores that are capable of handling hundreds or thousands of software threads simultaneously. The GPU(s) 608 may generate pixel data for output images in response to rendering commands (e.g., rendering commands from the CPU(s) 606 received via a host interface). The GPU(s) 608 may include graphics memory, such as display memory, for storing pixel data or any other suitable data, such as GPGPU data. The display memory may be included as part of the memory 604. The GPU(s) 608 may include two or more GPUs operating in parallel (e.g., via a link). The link may directly connect the GPUs (e.g., using NVLINK) or may connect the GPUs through a switch (e.g., using NVSwitch). When combined together, each GPU 608 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 606 and/or the GPU(s) 608, the logic unit(s) 620 may be configured to execute at least some of the computer-readable instructions to control one or more components of the computing device 600 to perform one or more of the methods and/or processes described herein. In embodiments, the CPU(s) 606, the GPU(s) 608, and/or the logic unit(s) 620 may discretely or jointly perform any combination of the methods, processes and/or portions thereof. One or more of the logic units 620 may be part of and/or integrated in one or more of the CPU(s) 606 and/or the GPU(s) 608 and/or one or more of the logic units 620 may be discrete components or otherwise external to the CPU(s) 606 and/or the GPU(s) 608. In embodiments, one or more of the logic units 620 may be a coprocessor of one or more of the CPU(s) 606 and/or one or more of the GPU(s) 608.

Examples of the logic unit(s) 620 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMS), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 610 may include one or more receivers, transmitters, and/or transceivers that allow the computing device 600 to communicate with other computing devices via an electronic communication network, included wired and/or wireless communications. The communication interface 610 may include components and functionality to allow communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 620 and/or communication interface 610 may include one or more data processing units (DPUs) to transmit data received over a network and/or through interconnect system 602 directly to (e.g., a memory of) one or more GPU(s) 608.

The I/O ports 612 may allow the computing device 600 to be logically coupled to other devices including the I/O components 614, the presentation component(s) 618, and/or other components, some of which may be built in to (e.g., integrated in) the computing device 600. Illustrative I/O components 614 include a microphone, mouse, keyboard, joystick, game pad, game controller, satellite dish, scanner, printer, wireless device, etc. The I/O components 614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be include depth cameras, such as stereoscopic camera systems, infrared camera systems, RGB camera systems, touchscreen technology, and combinations of these, for gesture detection and recognition. Additionally, the computing device 600 may include accelerometers or gyroscopes (e.g., as part of an inertia measurement unit (IMU)) that allow detection of motion. In some examples, the output of the accelerometers or gyroscopes may be used by the computing device 600 to render immersive augmented reality or virtual reality.

The power supply 616 may include a hard-wired power supply, a battery power supply, or a combination thereof. The power supply 616 may provide power to the computing device 600 to allow the components of the computing device 600 to operate.

The presentation component(s) 618 may include a display (e.g., a monitor, a touch screen, a television screen, a heads-up-display (HUD), other display types, or a combination thereof), speakers, and/or other presentation components. The presentation component(s) 618 may receive data from other components (e.g., the GPU(s) 608, the CPU(s) 606, DPUs, etc.), and output the data (e.g., as an image, video, sound, etc.).

Example Data Center

Figure 7:
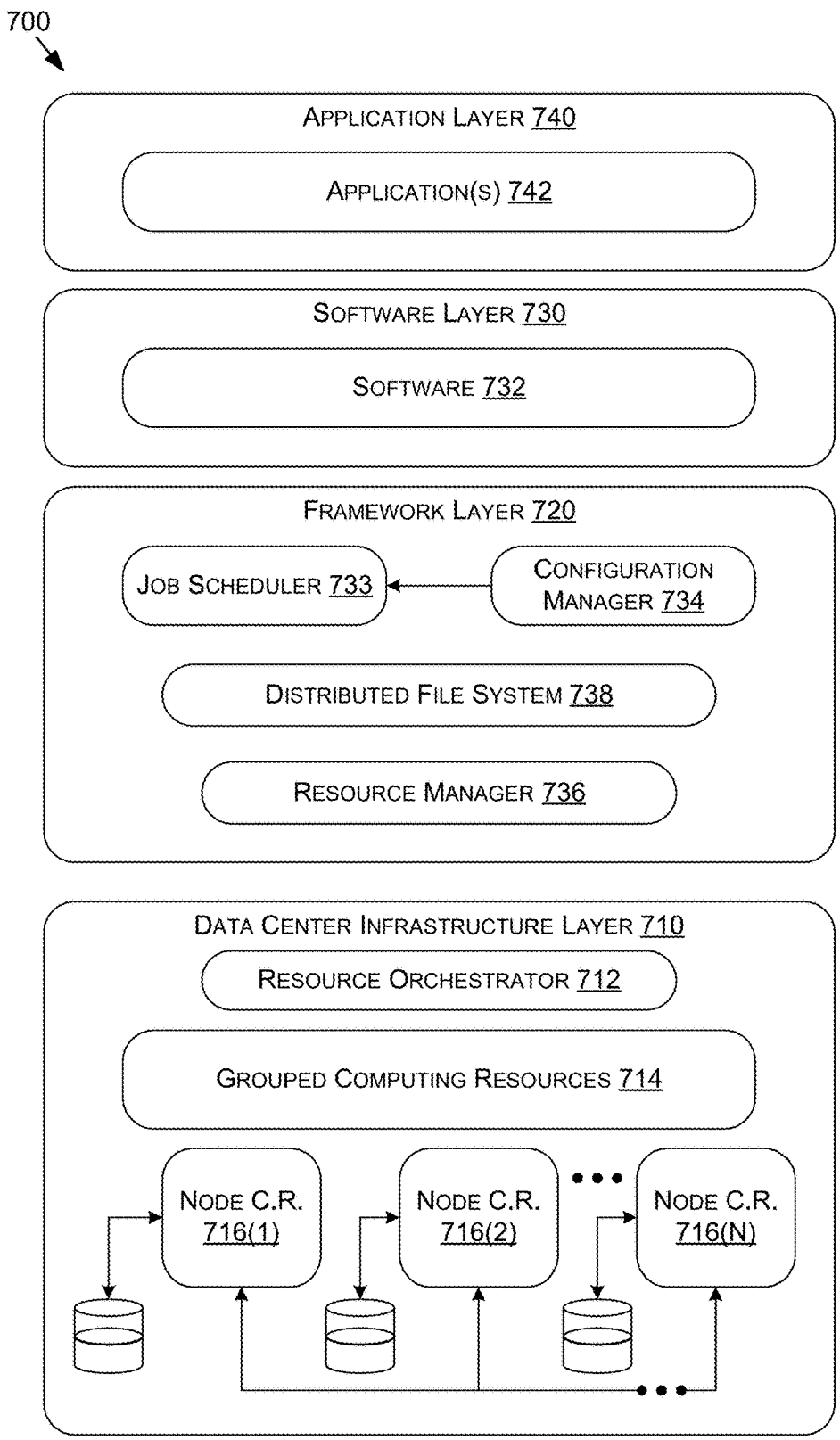
FIG. 7 is a block diagram of an example data center suitable for use in implementing some embodiments of the present disclosure.

FIG. 7 illustrates an example data center 700 that may be used in at least one embodiments of the present disclosure. The data center 700 may include a data center infrastructure layer 710, a framework layer 720, a software layer 730, and/or an application layer 740.

As shown in FIG. 7, the data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 716(1)-716(N) may correspond to a server having one or more of the above-mentioned computing resources. In addition, in some embodiments, the node C.R.s 716(1)-7161(N) may include one or more virtual components, such as vGPUs, vCPUs, and/or the like, and/or one or more of the node C.R.s 716(1)-716(N) may correspond to a virtual machine (VM).

In at least one embodiment, grouped computing resources 714 may include separate groupings of node C.R.s 716 housed within one or more racks (not shown), or many racks housed in data centers at various geographical locations (also not shown). Separate groupings of node C.R.s 716 within grouped computing resources 714 may include grouped compute, network, memory or storage resources that may be configured or allocated to support one or more workloads. In at least one embodiment, several node C.R.s 716 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 712 may configure or otherwise control one or more node C.R.s 716(1)-716(N) and/or grouped computing resources 714. In at least one embodiment, resource orchestrator 712 may include a software design infrastructure (SDI) management entity for the data center 700. The resource orchestrator 712 may include hardware, software, or some combination thereof.

In at least one embodiment, as shown in FIG. 7, framework layer 720 may include a job scheduler 733, a configuration manager 734, a resource manager 736, and/or a distributed file system 738. The framework layer 720 may include a framework to support software 732 of software layer 730 and/or one or more application(s) 742 of application layer 740. The software 732 or application(s) 742 may respectively include web-based service software or applications, such as those provided by Amazon Web Services, Google Cloud and Microsoft Azure. The framework layer 720 may be, but is not limited to, a type of free and open-source software web application framework such as Apache Spark™ (hereinafter "Spark") that may use distributed file system 738 for large-scale data processing (e.g., "big data"). In at least one embodiment, job scheduler 733 may include a Spark driver to facilitate scheduling of workloads supported by various layers of data center 700. The configuration manager 734 may be capable of configuring different layers such as software layer 730 and framework layer 720 including Spark and distributed file system 738 for supporting large-scale data processing. The resource manager 736 may be capable of managing clustered or grouped computing resources mapped to or allocated for support of distributed file system 738 and job scheduler 733. In at least one embodiment, clustered or grouped computing resources may include grouped computing resource 714 at data center infrastructure layer 710. The resource manager 736 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 738 of framework layer 720. One or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 738 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 734, resource manager 736, and resource orchestrator 712 may implement any number and type of self-modifying actions based on any amount and type of data acquired in any technically feasible fashion. Self-modifying actions may relieve a data center operator of data center 700 from making possibly bad configuration decisions and possibly avoiding underutilized and/or poor performing portions of a data center.

The data center 700 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 700. In at least one embodiment, trained or deployed machine learning models corresponding to one or more neural networks may be used to infer or predict information using resources described above with respect to the data center 700 by using weight parameters calculated through one or more training techniques, such as but not limited to those described herein.

In at least one embodiment, the data center 700 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 600 of FIG. 6—e.g., each device may include similar components, features, and/or functionality of the computing device(s) 600. In addition, where backend devices (e.g., servers, NAS, etc.) are implemented, the backend devices may be included as part of a data center 700, an example of which is described in more detail herein with respect to FIG. 7.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 600 described herein with respect to FIG. 6. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Example Literal Support

In an example embodiment, one or more processors comprise processing circuitry to: generate, based at least on sensor data corresponding to a first time slice and generated using one or more sensors of an ego-machine in an environment, two or more image frames; switch, based at least on a state of the ego-machine, from enabling a first environmental modeling pipeline that models the environment as a three-dimensional (3D) bowl to enabling a second environmental modeling pipeline that models the environment as a detected 3D surface topology; and generate a visualization of the environment based at least on applying the two or more image frames to the second environmental modeling pipeline.

In some embodiments, the second environmental modeling pipeline models the environment as a detected 3D surface topology based at least on a point cloud.

In some embodiments, the second environmental modeling pipeline models the environment as a detected 3D surface topology based at least on a truncated signed distance function (TSDF).

In some embodiments, the processing circuitry further to switch from enabling the first environmental modeling pipeline to enabling the second environmental modeling pipeline based at least on detecting that the state of the ego-machine comprises a detected proximity to a detected pedestrian.

In some embodiments, the processing circuitry further to switch from enabling the first environmental modeling pipeline to enabling the second environmental modeling pipeline based at least on detecting that the state of the ego-machine comprises a detected depth to an object of an unsupported class.

In some embodiments, the processing circuitry further to switch from enabling the first environmental modeling pipeline to enabling the second environmental modeling pipeline based on detecting that the state of the ego-machine is operating in, or is predicted to begin operating in, a parking scenario.

In some embodiments, the processing circuitry further to cause, based at least on detecting that a measure of estimated image quality of the visualization is above a designated threshold value, presentation of an indication that one or more visualizations associated with the second environmental pipeline are available, wherein the processing circuitry is further to generate the visualization in response to a selection of one of the one or more visualizations by an operator of the ego-machine.

In some embodiments, the processing circuitry further to cause, based at least on detecting that the state of the ego-machine comprises a speed of ego-motion below a threshold speed, presentation of an indication that one or more visualizations associated with the second environmental pipeline are available, wherein the processing circuitry is further to generate the visualization in response to a selection of one of the one or more visualizations by an operator of the ego-machine.

In some embodiments, the processing circuitry further to generate the visualization using a simulated representation of a detected object based at least on detecting that at least one of: the detected object is occluded or the detected object is located between the ego-machine and a virtual camera used to generate the visualization.

In some embodiments, the processing circuitry is comprised in at least one of: a control system for an autonomous or semi-autonomous machine; a perception system for an autonomous or semi-autonomous machine; a system for performing simulation operations; a system for performing digital twin operations; a system for performing light transport simulation; a system for performing collaborative content creation for 3D assets; a system for performing deep learning operations; a system for performing remote operations; a system for performing real-time streaming; a system for generating or presenting one or more of augmented reality content, virtual reality content, or mixed reality content; a system implemented using an edge device; a system implemented using a robot; a system for performing conversational AI operations; a system implementing one or more language models; a system implementing one or more large language models (LLMs); a system for generating synthetic data; a system for generating synthetic data using AI; a system incorporating one or more virtual machines (VMs); a system implemented at least partially in a data center; or a system implemented at least partially using cloud computing resources.

In an example embodiment, a system comprises one or more processors to switch, based at least on a detected state of an ego-machine in an environment, between enabling a first environment modeling pipeline that models the environment as a three-dimensional (3D) bowl and enabling a second environment modeling pipeline that models the environment as a detected 3D surface topology.

In some embodiments, the second environmental modeling pipeline models the environment as a detected 3D surface topology based at least on a point cloud.

In some embodiments, the second environmental modeling pipeline models the environment as a detected 3D surface topology based at least on a truncated signed distance function (TSDF).

In some embodiments, the processing circuitry further to switch between enabling the first environmental modeling pipeline to enabling the second environmental modeling pipeline based at least on determining that the detected state of the ego-machine indicates a designated operational scenario.

In some embodiments, the one or more processors further to cause, based at least on detecting that a measure of estimated image quality of a visualization associated with the second environmental modeling pipeline is above a designated threshold value, presentation of an indication that one or more visualizations associated with the second environmental pipeline are available, wherein the processing circuitry is further to generate the visualization in response to a selection of one of the one or more visualizations by an operator of the ego-machine.

In some embodiments, the one or more processors further to cause, based at least on determining that the detected state of the ego-machine comprises a speed of ego-motion below a threshold speed, presentation of an indication that one or more visualizations associated with the second environmental pipeline are available, wherein the processing circuitry is further to generate a visualization associated with the second environmental pipeline in response to a selection of one of the one or more visualizations by an operator of the ego-machine.

In some embodiments, the one or more processors further to generate a visualization associated with the second environmental modeling pipeline using a simulated representation of a detected object based at least on detecting that at least one of: the detected object is occluded or the detected object is located between the ego-machine and a virtual camera used to generate the visualization.

In some embodiments, the system is comprised in at least one of a control system for an autonomous or semi-autonomous machine; a perception system for an autonomous or semi-autonomous machine; a system for performing simulation operations; a system for performing digital twin operations; a system for performing light transport simulation; a system for performing collaborative content creation for 3D assets; a system for performing deep learning operations; a system for performing remote operations; a system for performing real-time streaming; a system for generating or presenting one or more of augmented reality content, virtual reality content, or mixed reality content; a system implemented using an edge device; a system implemented using a robot; a system for performing conversational AI operations; a system implementing one or more language models; a system implementing one or more large language models (LLMs); a system for generating synthetic data; a system for generating synthetic data using AI; a system incorporating one or more virtual machines (VMs); a system implemented at least partially in a data center; or a system implemented at least partially using cloud computing resources.

In an example embodiment, a method comprises: determining, based at least on a detected state of an ego-machine in an environment, whether to enable a first supported environmental modeling pipeline that models the environment as a three-dimensional (3D) bowl or a second supported environmental modeling pipeline that models the environment without a 3D bowl; and executing an operation based at least on the first supported environmental modeling pipeline or the second supported environmental modeling pipeline.

In some embodiments, the method is performed by at least one of: a control system for an autonomous or semi-autonomous machine; a perception system for an autonomous or semi-autonomous machine; a system for performing simulation operations; a system for performing digital twin operations; a system for performing light transport simulation; a system for performing collaborative content creation for 3D assets; a system for performing deep learning operations; a system for performing remote operations; a system for performing real-time streaming; a system for generating or presenting one or more of augmented reality content, virtual reality content, or mixed reality content; a system implemented using an edge device; a system implemented using a robot; a system for performing conversational AI operations; a system implementing one or more language models; a system implementing one or more large language models (LLMs); a system for generating synthetic data; a system for generating synthetic data using AI; a system incorporating one or more virtual machines (VMs); a system implemented at least partially in a data center; or a system implemented at least partially using cloud computing resources.

What is claimed is:

1. One or more processors comprising processing circuitry to:
   generate two or more image frames based at least on sensor data, the sensor data corresponding to a first time slice and generated using one or more sensors of an ego-machine in an environment;
   switch, based at least on a state of the ego-machine, from generating a first visualization of the environment using a three-dimensional (3D) bowl model of the environment to generating a second visualization of the environment that uses a 3D surface topology model of the environment; and
   present the second visualization of the environment based at least on the two or more image frames.

2. The one or more processors of claim 1, wherein the second visualization of the environment is generated by modeling the environment as a 3D surface topology of one or more objects in the environment based at least on a point cloud corresponding to the one or more objects.

3. The one or more processors of claim 1, wherein the second visualization of the environment is generated by modeling the environment as a 3D surface topology of one or more objects in the environment based at least on a truncated signed distance function (TSDF) representative of a distance between the ego-machine and the one or more objects in the environment.

4. The one or more processors of claim 1, the processing circuitry further to switch from generating the first visualization to generating the second visualization based at least on detecting that the state of the ego-machine comprises a detected proximity to a detected vulnerable road user (VRU).

5. The one or more processors of claim 1, the processing circuitry further to switch from generating the first visualization to generating the second visualization based at least on detecting that the state of the ego-machine comprises a detected depth to an object of an unsupported class.

6. The one or more processors of claim 1, the processing circuitry further to switch from generating the first visualization to generating the second visualization based on detecting that the state of the ego-machine is operating in, or is predicted to begin operating in, a parking scenario.

7. The one or more processors of claim 1, the processing circuitry further to cause, based at least on detecting that a measure of estimated image quality of the second visualization is above a designated threshold value, presentation of an indication that the second visualization is available.

8. The one or more processors of claim 1, the processing circuitry further to cause, based at least on detecting that the state of the ego-machine comprises a speed of ego-motion below a threshold speed, presentation of an indication that the second visualization is available.

9. The one or more processors of claim 1, the processing circuitry further to generate the second visualization using a simulated representation of a detected object based at least on detecting that at least one of: the detected object is occluded or the detected object is located between the ego-machine and a virtual camera used to generate the second visualization.

10. The one or more processors of claim 1, wherein the one or more processors are comprised in at least one of:
   a control system for an autonomous or semi-autonomous machine;
   a perception system for an autonomous or semi-autonomous machine;
   a system for performing simulation operations;
   a system for performing digital twin operations;
   a system for performing light transport simulation;
   a system for performing collaborative content creation for 3D assets;
   a system for performing deep learning operations;
   a system for performing remote operations;
   a system for performing real-time streaming;
   a system for generating or presenting one or more of augmented reality content, virtual reality content, or mixed reality content;
   a system implemented using an edge device;
   a system implemented using a robot;
   a system for performing conversational AI operations;
   a system implementing one or more language models;
   a system implementing one or more large language models (LLMs);
   a system for generating synthetic data;
   a system for generating synthetic data using AI;
   a system incorporating one or more virtual machines (VMs);
   a system implemented at least partially in a data center; or
   a system implemented at least partially using cloud computing resources.

11. A system comprising one or more processors to switch, based at least on a detected state of an ego-machine in an environment, between generating a first visualization of the environment using a three-dimensional (3D) bowl model of the environment to generating a second visualization of the environment that uses a 3D surface topology model of the environment.

12. The system of claim 11, wherein the second visualization of the environment is generated by modeling the environment as a detected 3D surface topology based at least on a point cloud.

13. The system of claim 11, wherein the second visualization of the environment is generated by modeling the environment as a detected 3D surface topology based at least on a truncated signed distance function (TSDF).

14. The system of claim 11, one or more processors further to switch between generating the first visualization to generating the second visualization based at least on determining that the detected state of the ego-machine indicates a designated operational scenario.

15. The system of claim 11, the one or more processors further to cause, based at least on detecting that a measure of estimated image quality of a visualization associated with a second environmental modeling pipeline is above a designated threshold value, presentation of an indication that the second visualization is available.

16. The system of claim 11, the one or more processors further to cause, based at least on determining that the detected state of the ego-machine comprises a speed of ego-motion below a threshold speed, presentation of an indication that the second visualization is available.

17. The system of claim 11, the one or more processors further to generate the second visualization using a simulated representation of a detected object based at least on detecting that at least one of: the detected object is occluded or the detected object is located between the ego-machine and a virtual camera used to generate the second visualization.

18. The system of claim 11, wherein the system is comprised in at least one of:
a control system for an autonomous or semi-autonomous machine;
a perception system for an autonomous or semi-autonomous machine;
a system for performing simulation operations;
a system for performing digital twin operations;
a system for performing light transport simulation;
a system for performing collaborative content creation for 3D assets;
a system for performing deep learning operations;
a system for performing remote operations;
a system for performing real-time streaming;
a system for generating or presenting one or more of augmented reality content, virtual reality content, or mixed reality content;
a system implemented using an edge device;
a system implemented using a robot;
a system for performing conversational AI operations;
a system implementing one or more language models;
a system implementing one or more large language models (LLMs);
a system for generating synthetic data;
a system for generating synthetic data using AI;
a system incorporating one or more virtual machines (VMs);
a system implemented at least partially in a data center; or
a system implemented at least partially using cloud computing resources.

19. A method comprising:
determining, based at least on a detected state of an ego-machine in an environment, whether to enable generation of a first visualization of the environment using a three-dimensional (3D) bowl model of the environment or generation of a second visualization of the environment that uses a 3D surface topology model of the environment; and
executing an operation based at least on presentation of the first visualization or the second visualization.

20. The method of claim 19, wherein the method is performed by at least one of:
a control system for an autonomous or semi-autonomous machine;
a perception system for an autonomous or semi-autonomous machine;
a system for performing simulation operations;
a system for performing digital twin operations;
a system for performing light transport simulation;
a system for performing collaborative content creation for 3D assets;
a system for performing deep learning operations;
a system for performing remote operations;
a system for performing real-time streaming;
a system for generating or presenting one or more of augmented reality content, virtual reality content, or mixed reality content;
a system implemented using an edge device;
a system implemented using a robot;
a system for performing conversational AI operations;
a system implementing one or more language models;
a system implementing one or more large language models (LLMs);
a system for generating synthetic data;
a system for generating synthetic data using AI;
a system incorporating one or more virtual machines (VMs);
a system implemented at least partially in a data center; or
a system implemented at least partially using cloud computing resources.

* * * * *